US010216018B2

(12) United States Patent
Fang et al.

(10) Patent No.: US 10,216,018 B2
(45) Date of Patent: Feb. 26, 2019

(54) VIEWING ANGLE CONTROL DEVICE AND VIEWING ANGLE CONTROLLABLE DISPLAY APPARATUS

(71) Applicant: Coretronic Corporation, Hsin-Chu (TW)

(72) Inventors: Chong-Yang Fang, Hsin-Chu (TW); Wen-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/730,740

(22) Filed: Oct. 12, 2017

(65) Prior Publication Data

US 2018/0113334 A1   Apr. 26, 2018

(30) Foreign Application Priority Data

Oct. 25, 2016  (TW) .............................. 105216211 U

(51) Int. Cl.
  *G02F 1/13*     (2006.01)
  *G02F 1/1347*   (2006.01)
  (Continued)

(52) U.S. Cl.
  CPC ........ *G02F 1/1323* (2013.01); *G02F 1/13363* (2013.01); *G02F 1/13471* (2013.01);
  (Continued)

(58) Field of Classification Search
  None
  See application file for complete search history.

(56) References Cited

U.S. PATENT DOCUMENTS 7,267,849 B2    9/2007  Lazarev et al.
2005/0206814 A1 9/2005  Histake
                        (Continued)

FOREIGN PATENT DOCUMENTS

CN   1702517    11/2005
CN   101473168  7/2009
              (Continued)

OTHER PUBLICATIONS

"Search Report of Europe Counterpart Application", dated Mar. 13, 2018, p. 1-p. 8, in which the listed references were cited.
(Continued)

*Primary Examiner* — James Dudek
(74) *Attorney, Agent, or Firm* — JCIPRNET

(57) ABSTRACT

A viewing angle control device including at least one liquid crystal panel, at least one compensation film and polarizers is provided. Each of the at least one liquid crystal panel includes two transparent conductive layers and liquid crystal molecules. The polarizers include at least one first polarizer and a second polarizer. The at least one first polarizer is located between the at least one compensation film and the at least one liquid crystal panel. The second polarizer is located at a side of the at least one liquid crystal panel, the at least one compensation film and the at least one first polarizer. When there is no potential difference between the transparent conductive layers, an optical axis of each of the liquid crystal molecules is parallel or vertical to a transmission axis of the at least one first polarizer. A viewing angle controllable display apparatus is also provided.

25 Claims, 26 Drawing Sheets

(51) Int. Cl.
*G02F 1/1335* (2006.01)
*G02F 1/13363* (2006.01)
*F21V 8/00* (2006.01)

(52) U.S. Cl.
CPC ...... *G02F 1/133528* (2013.01); *G02B 6/0051* (2013.01); *G02B 6/0053* (2013.01); *G02B 6/0055* (2013.01); *G02F 1/133632* (2013.01); *G02F 1/133634* (2013.01); *G02F 2001/133531* (2013.01); *G02F 2001/133633* (2013.01); *G02F 2001/133638* (2013.01); *G02F 2413/02* (2013.01); *G02F 2413/05* (2013.01); *G02F 2413/10* (2013.01); *G02F 2413/11* (2013.01)

(56) References Cited

U.S. PATENT DOCUMENTS

| | | |
|---|---|---|
| 2007/0236939 A1 | 10/2007 | Ouderkirk et al. |
| 2009/0174843 A1* | 7/2009 | Sakai ................ G02F 1/13471 349/74 |
| 2010/0149459 A1 | 6/2010 | Yabuta et al. |
| 2010/0265435 A1 | 10/2010 | Hwang et al. |
| 2010/0289989 A1 | 11/2010 | Adachi et al. |
| 2011/0043736 A1 | 2/2011 | Liu |
| 2011/0309398 A1 | 12/2011 | Ito et al. |
| 2015/0346532 A1 | 12/2015 | Do et al. |
| 2017/0116937 A1 | 4/2017 | Du et al. |
| 2017/0219859 A1 | 8/2017 | Christophy et al. |
| 2017/0343715 A1 | 11/2017 | Fang et al. |

FOREIGN PATENT DOCUMENTS

| | | |
|---|---|---|
| CN | 101681061 | 3/2010 |
| CN | 101414022 | 10/2010 |
| CN | 105807485 | 7/2016 |
| EP | 0918247 | 5/1999 |
| EP | 2051134 | 4/2009 |
| JP | 2004206130 | 7/2004 |
| JP | 2008003450 | 1/2008 |
| JP | 2008096458 | 4/2008 |
| JP | 2009522601 | 6/2009 |
| JP | 2011508270 | 3/2011 |
| TW | 200630651 | 9/2006 |
| TW | I274918 | 3/2007 |
| TW | 200714943 | 4/2007 |
| TW | 200730935 | 8/2007 |
| TW | 200807083 | 2/2008 |
| TW | 200903053 | 1/2009 |
| TW | I309312 | 5/2009 |
| TW | 201031969 | 9/2010 |
| TW | I356937 | 1/2012 |
| TW | I364564 | 5/2012 |
| TW | I412578 | 10/2013 |
| TW | M537663 | 3/2017 |
| WO | 2016195786 | 12/2016 |

OTHER PUBLICATIONS

Yuzo Histake, et al., "31.3: Viewing Angle Controllable LCD using Variable Optical Compensator and Variable Diffuser," SID International symposium digest of technical papers, vol. 36, Issue 1, May 2005, pp. 1218-1221.

* cited by examiner

VIEWING ANGLE CONTROL DEVICE AND VIEWING ANGLE CONTROLLABLE DISPLAY APPARATUS

CROSS-REFERENCE TO RELATED APPLICATION

This application claims the priority benefit of Taiwan application serial no. 105216211, filed on Oct. 25, 2016. The entirety of the above-mentioned patent application is hereby incorporated by reference herein and made a part of this specification.

BACKGROUND OF THE INVENTION

Field of the Invention

The invention relates to an optical device and a display device using the optical device, and more particularly to a viewing angle control device and a viewing angle controllable display apparatus using the viewing angle control device.

Description of Related Art

Generally speaking, in order for more viewers to be able to see, a display device is usually designed to have a wide viewing angle for better display effect. However, under some particular circumstances or on special occasions, e.g. browsing a personal web page, confidential information or inputting password at a public space, the display effect of wide viewing angle can easily allow other people to see the confidential information and causes leakage of confidential information. To meet the need of privacy protection, a general method is to put a light control film (LCF) in front of the display device so as to filter light of large angles. When there is no need for privacy protection, the LCF is then removed manually. Since the user has to put/remove the LCF manually, it is rather inconvenient in use. Therefore, it is necessary to provide a viewing angle control device that can adjust the viewing angle of the display device so that the display device can select or adjust the viewing angle of the display image according to operational requirements.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a viewing angle control device which controls the viewing angle through the means of electrical control.

The invention further provides a viewing angle controllable display apparatus which uses the viewing angle control device and can switch between a general display mode and a privacy-protecting mode.

The other purposes and advantages of the invention may be further understood from the technical features disclosed in the invention.

In order to achieve at least one of the objects or other objects, an embodiment of the invention provides a viewing angle control device comprising at least one liquid crystal panel, at least one compensation film and a plurality of polarizers. Each of the at least one liquid crystal panel includes two transparent conductive layers and a plurality of liquid crystal molecules located between the transparent conductive layers. The at least one compensation film is overlapped with the at least one liquid crystal panel. The polarizers include at least one first polarizer and a second polarizer. The at least one first polarizer is located between the at least one compensation film and the at least one liquid crystal panel. The second polarizer is located at one side of the at least one liquid crystal panel, the at least one compensation film and the at least one first polarizer. When there is no potential difference between the transparent conductive layers, an optical axis of each liquid crystal molecule is parallel or perpendicular to a transmission axis of the at least one first polarizer. When there is potential difference between the transparent conductive layers, the optical axis of each liquid crystal molecule is inclined with respect to the transmission axis or an absorption axis of the at least one first polarizer.

In order to achieve at least one of the objects or other objects, an embodiment of the invention provides a viewing angle controllable display apparatus comprising a display panel and a viewing angle control device. The viewing angle control device is overlapped with the display panel, and the viewing angle control device includes at least one liquid crystal panel, at least one compensation film and a plurality of polarizers. Each of the at least one liquid crystal panel includes two transparent conductive layers and a plurality of liquid crystal molecules located between the transparent conductive layer. The at least one compensation film is overlapped with the at least one liquid crystal panel. The polarizer includes at least one first polarizer and a second polarizer. The at least one first polarizer is located between the compensation film and the at least one liquid crystal panel. The at least one liquid crystal panel, the at least one compensation film and the at least one first polarizer are located between the second polarizer and the display panel. When there is no potential difference between the transparent conductive layers, an optical axis of each liquid crystal molecule is parallel or perpendicular to a transmission axis of the at least one first polarizer. When there is potential difference between the transparent conductive layers, the optical axis of each liquid crystal molecule is inclined with respect to the transmission axis or an absorption axis of the at least one first polarizer.

Based on the above, the embodiments of the invention at least have one of the following advantages or effects. The viewing angle control device of the invention can control the inclining direction of the liquid crystal molecules by changing the potential difference between the transparent conductive layers, such that the light beam that is incident into the viewing angle control device from a large angle generates phase retardation and cannot pass through the polarizer, thereby satisfying the need of limiting viewing angle (privacy protection). On the other hand, the viewing angle controllable display apparatus using the viewing angle control device can switch between the general display mode and the privacy protecting mode through the means of electrical control.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
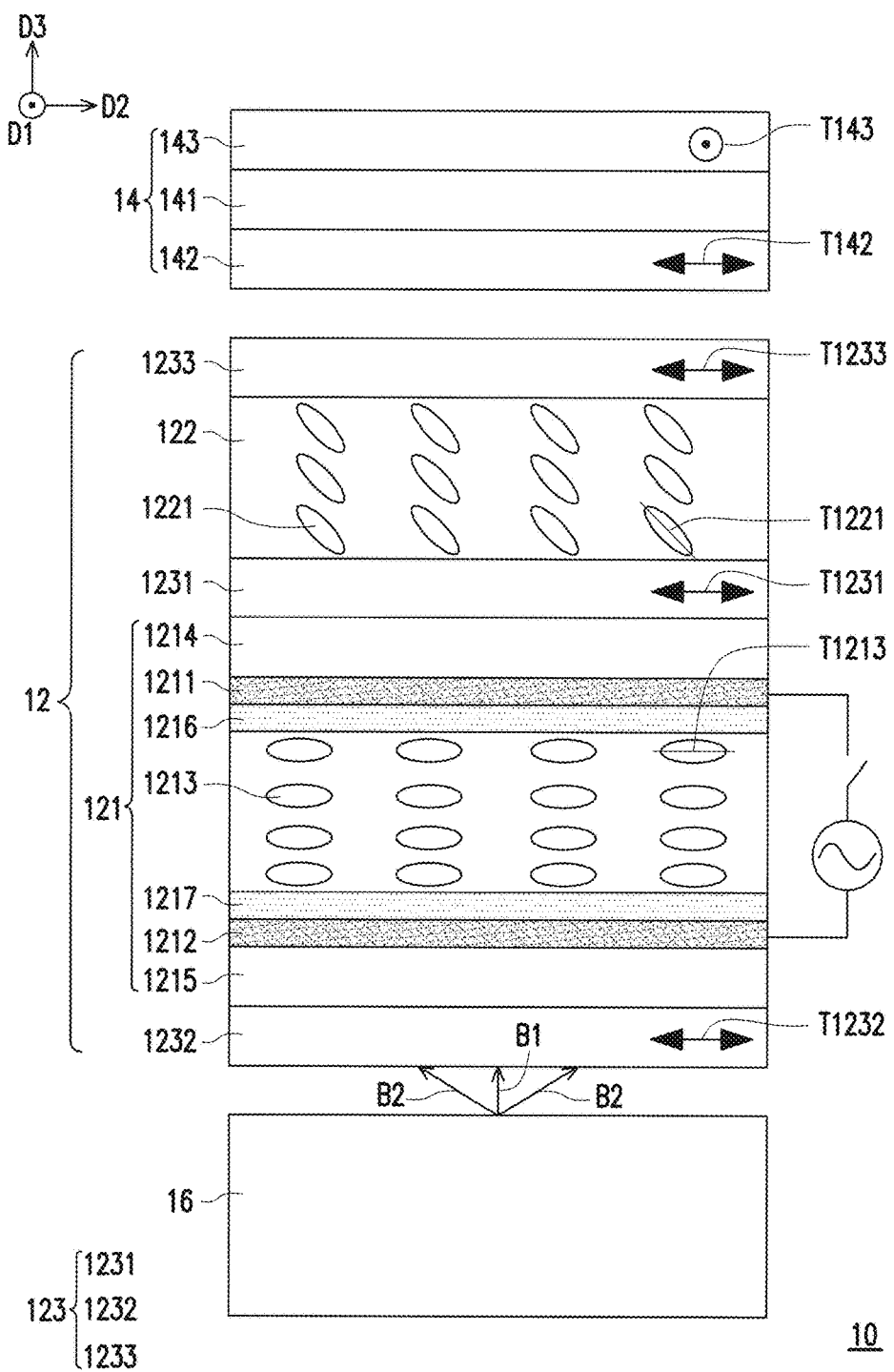
FIGS. 1A and 1B are sectional schematic views respectively illustrating a viewing angle controllable display apparatus in a general display mode and a privacy protecting mode according to a first embodiment of the invention.
Figure 1B:
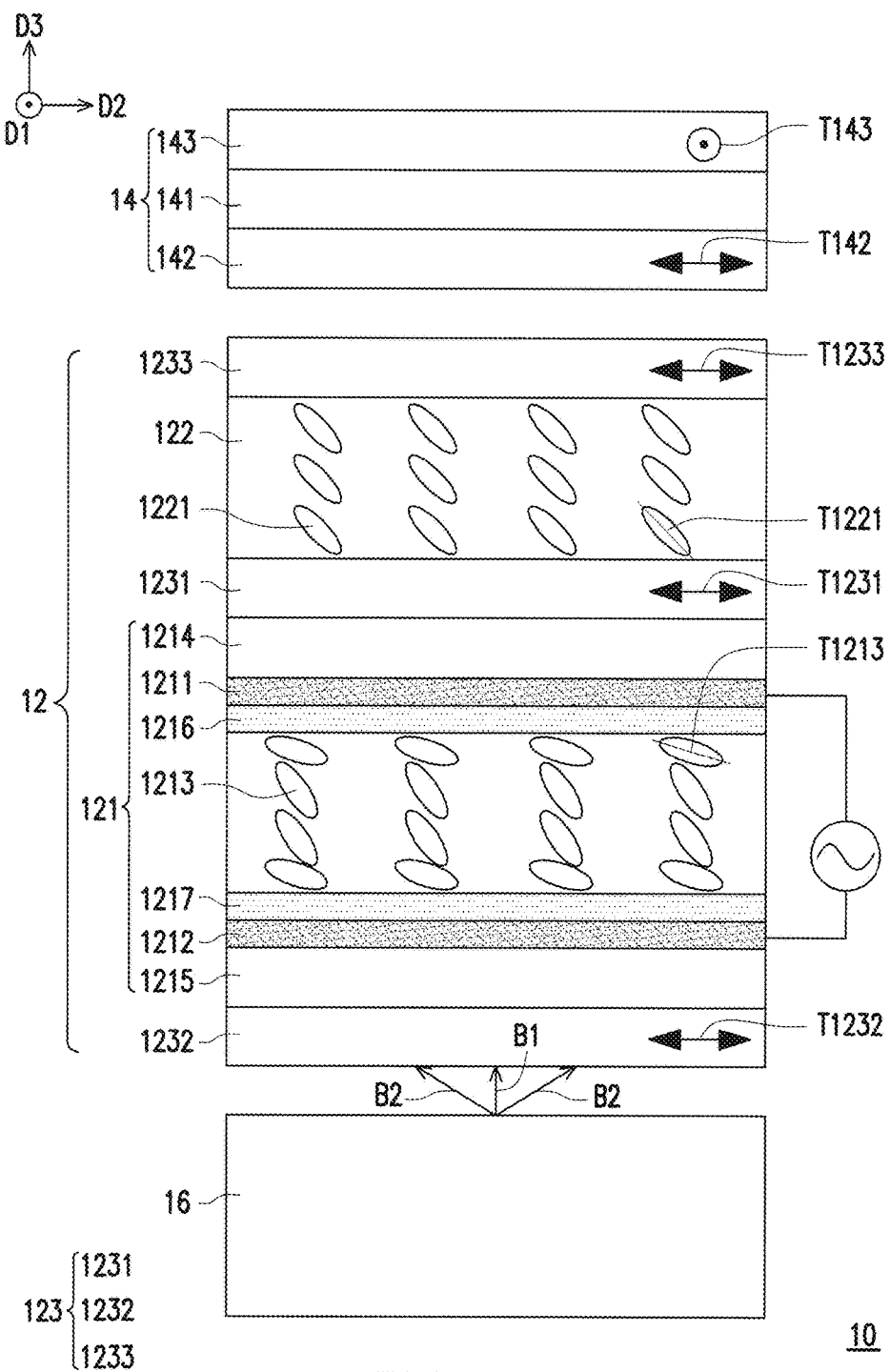
Figure 1C:
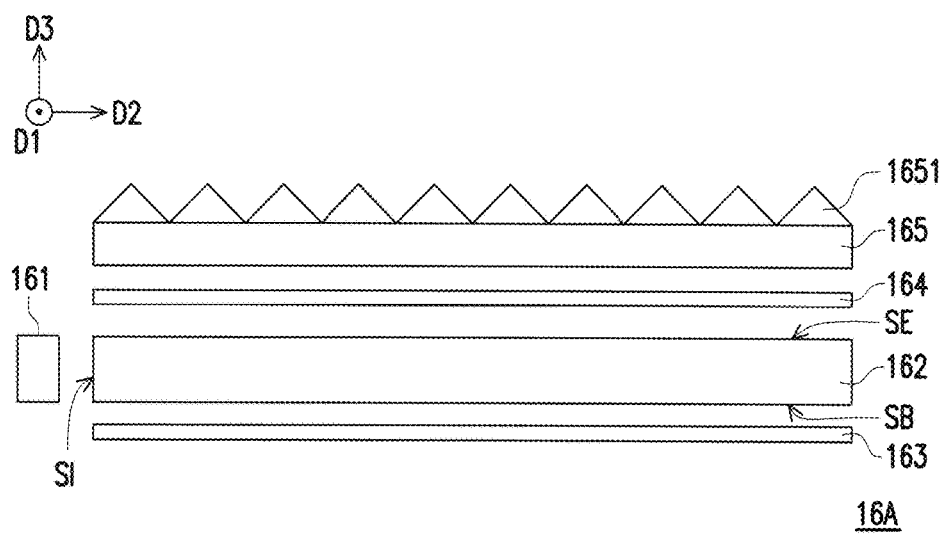
FIGS. 1C and 1D are sectional schematic views respectively illustrating a first and a second light source modules in FIGS. 1A and 1B.
Figure 1D:
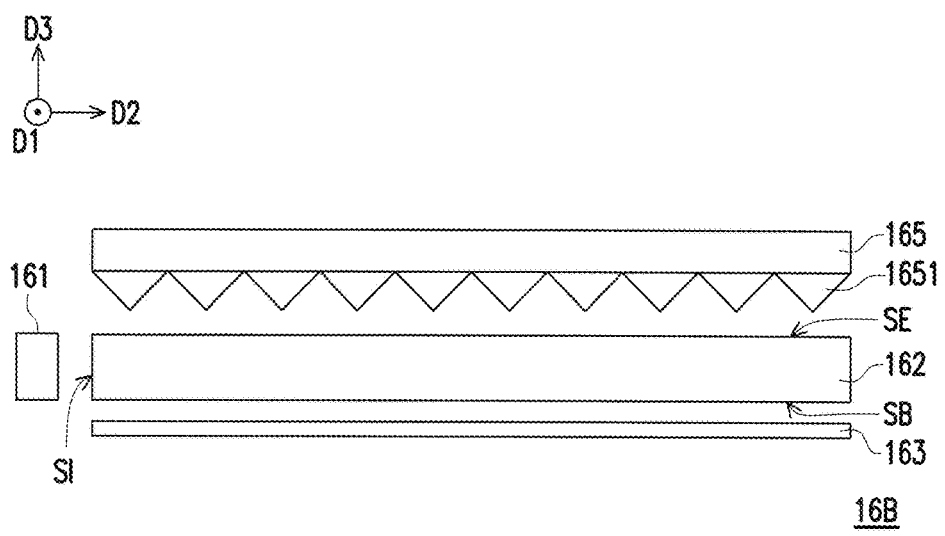

FIGS. 1A and 1B are sectional schematic views respectively illustrating a viewing angle controllable display apparatus in a general display mode and a privacy protecting mode according to a first embodiment of the invention. FIGS. 1C and 1D are sectional schematic views respectively illustrating a first and a second light source modules in FIGS. 1A and 1B. Referring to FIGS. 1A and 1B, a viewing angle controllable display apparatus 10 includes a viewing angle control device 12 and a display panel 14.

The viewing angle control device 12 includes at least one liquid crystal panel 121, at least one compensation film 122 and a plurality of polarizers (the set of the plurality of polarizers is denoted by a numeral 123). Each of the at least one liquid crystal panel 121 includes a transparent conductive layer 1211, a transparent conductive layer 1212 and a plurality of liquid crystal molecules 1213 located between the transparent conductive layer 1211 and the transparent conductive layer 1212. In the embodiment, each of the at least one liquid crystal panel 121 may further include a substrate 1214, a substrate 1215, an alignment layer 1216 and an alignment layer 1217. The transparent conductive layer 1211 is disposed on a surface of the substrate 1214 facing the liquid crystal molecules 1213. The transparent conductive layer 1212 is disposed on a surface of the substrate 1215 facing the liquid crystal molecules 1213. The alignment layer 1216 is located between the liquid crystal molecules 1213 and the transparent conductive layer 1211. The alignment layer 1217 is located between the liquid crystal molecules 1213 and the transparent conductive layer 1212.

The at least one compensation film 122 is overlapped with the at least one liquid crystal panel 121. For example, the at least one compensation film 122 may be located between the at least one liquid crystal panel 121 and the display panel 14, which should not be construed as a limitation to the invention. Each of the at least one compensation film 122 may be selected from one of groups consisting of an O-plate and a C-plate. For example, each of the at least one compensation film 122 may be formed of a liquid crystal polymer 1221. In the case of the O-plate, as shown in FIG. 1A, an optical axis T1221 of the liquid crystal polymer 1221 is inclined with respect to the substrate 1214. In the case of the C-plate, the optical axis T1221 of the liquid crystal polymer 1221 is perpendicular to the substrate 1214.

The polarizers (the set 123 of the plurality of polarizers) include at least one first polarizer 1231 and a second polarizer 1232. The at least one first polarizer 1231 is located between the at least one compensation film 122 and the at least one liquid crystal panel 121. The second polarizer 1232 is located on a side of the at least one liquid crystal panel 121, the at least one compensation film 122 and the at least one first polarizer 1231. Moreover, the at least one liquid crystal panel 121, the at least one compensation film 122 and the at least one first polarizer 1231 are, for example, located between the second polarizer 1232 and the display panel 14.

In the embodiment, the set 123 of the plurality of polarizers may further include a third polarizer 1233. The third polarizer 1233 is located between the second polarizer 1232 and the display panel 14. The at least one liquid crystal panel 121, the at least one compensation film 122 and the at least one first polarizer 1231 are located between the second polarizer 1232 and third polarizer 1233. In addition, a transmission axis T1231 of the at least one first polarizer 1231, a transmission axis T1232 of the second polarizer 1232 and a transmission axis T1233 of the third polarizer 1233 are parallel to each other.

When there is no potential difference between the transparent conductive layer 1211 and the transparent conductive layer 1212, as shown in FIG. 1A, an optical axis T1213 of each liquid crystal molecule 1213 is parallel to the transmission axis T1231 of the at least one first polarizer 1231. When there is potential difference between the transparent conductive layer 1211 and the transparent conductive layer 1212, as shown in FIG. 1B, the optical axis T1213 of each liquid crystal molecule 1213 is inclined with respect to the transmission axis T1231 of the at least one first polarizer 1231, which should not be construed as a limitation to the invention. In another embodiment, when there is no potential difference between the transparent conductive layer 1211 and the transparent conductive layer 1212, the optical axis T1213 of each liquid crystal molecule 1213 may be perpendicular to the transmission axis T1231 of the at least one first polarizer 1231. For example, the optical axis T1213 of each liquid crystal molecule 1213 may be parallel to a first direction D1 and perpendicular to the transmission axis T1231 of the at least one first polarizer 1231. With such configuration, when there is potential difference between the transparent conductive layer 1211 and the transparent conductive layer 1212, the optical axis T1213 of each liquid crystal molecule 1213 is inclined with respect to an absorption axis (not shown) of the at least one first polarizer 1231. The absorption axis of the at least one first polarizer 1231 is orthogonal to the transmission axis T1231 and parallel to the first direction D1.

The display panel 14 is overlapped with the viewing angle control device 12, and the display panel 14 can be any panel suitable for providing display information. For example, the display panel 14 may be a liquid crystal display panel or an organic light emitting diode display panel, which should not be construed as a limitation to the invention. Take the liquid crystal display panel as an example, the display panel 14 may include a liquid crystal panel 141, a light-incident surface polarizer 142 and a light-emitting surface polarizer 143. The liquid crystal panel 141 may include an active device array substrate (not shown), a color filter substrate (not shown) and a liquid crystal layer (not shown) located between the active device array substrate and the color filter substrate. The light-incident surface polarizer 142 and light-emitting surface polarizer 143 are respectively disposed on two opposite sides of the liquid crystal panel 141. A transmission axis T142 of the light-incident surface polarizer 142 and a transmission axis T143 of the light-emitting surface polarizer 143 may be perpendicular or parallel to each other.

If the display panel 14 adopts a liquid crystal display panel, the viewing angle controllable display apparatus 10 may further include a backlight module 16. The backlight module 16 may be a direct-type backlight module or a side-incident type backlight module. Take the side-incident backlight module as an example, the backlight module 16 may adopt a backlight module 16A shown in FIG. 1C or a backlight module 16B shown in FIG. 1D.

Referring to FIG. 1C, the backlight module 16A may include a light source 161, a light guide plate 162, a reflective sheet 163, a diffuser 164 and a prism sheet 165. The light guide plate 162 has a light-incident surface SI, a light-emitting surface SE and a bottom surface SB, wherein the light-emitting surface SE and the bottom surface SB are opposite to each other, and the light-incident surface SI is connected with the light-emitting surface SE and bottom surface SB. The light source 161 is disposed next to the light-incident surface SI and adapted to emit a light beam toward the light-incident surface SI. The reflective sheet 163 is disposed under the bottom surface SB. The diffuser 164 and the prism sheet 165 are sequentially stacked above the light-emitting surface SE. The prism sheet 165 has a plurality of stripe prisms 1651. The stripe prisms 1651, for example, extend along the first direction D1 and are arranged along a second direction D2. The prism sheet 165 is, for example, a triangular prism. That is, the stripe prisms 1651 point at a direction (e.g. a third direction D3) away from the light guide plate 162.

Referring to FIG. 1D, the backlight module 16B is similar to the backlight module 16A in FIG. 1C. The main difference between the backlight module 16B and backlight module 16A is described below. The backlight module 16B omits the diffuser 164, and the prism sheet 165 is, for example, an inverse prism. That is, the stripe prisms 1651 point at the direction (e.g. a reverse direction of the third direction D3) of the light guide plate 162. It should be pointed out that there is no need to dispose the inverse prism to be adjacent to the light guide plate 162 but just under the display panel 14. For example, in the configuration illustrated in FIG. 1A and FIG. 1B, the inverse prism may also be located between the light-incident surface polarizer 142 and the third polarizer 1233, which should not be construed as a limitation to the invention.

In the embodiment, the viewing angle control device 12 is located between the display panel 14 and the backlight module 16, and the third polarizer 1233 is adjacent to the light-incident surface polarizer 142 of the display panel 14. The transmission axis T142 of the light-incident surface polarizer 142 is parallel to the transmission axis T1233 of the third polarizer 1233 such that the light beam from the third polarizer 1233 passes through the light-incident surface polarizer 142, which should not be construed as a limitation to the invention. In another embodiment, the transmission axis T142 of the light-incident surface polarizer 142 may also be perpendicular to the transmission axis T1233 of the third polarizer 1233, and a half wave plate is disposed between the light-incident surface polarizer 142 and third polarizer 1233.

Referring to FIG. 1B, the light beam from the backlight module 16 includes a light beam B1 that is normally incident to the viewing angle control device 12 and a light beam B2 that is incident to the viewing angle control device 12 from a large angle. When there is potential difference between the transparent conductive layer 1211 and the transparent conductive layer 1212, the optical axis T1213 of each liquid crystal molecule 1213 is inclined with respect to the transmission axis T1232 of the second polarizer 1232 and the transmission axis T1231 of the at least one first polarizer 1231. The light beam B1 that is normally incident to the viewing angle control device 12 does not generate phase retardation after passing through the liquid crystal molecules 1213. The light beam B2 that is incident to the viewing angle control device 12 from a large angle generates phase retardation after passing through the liquid crystal molecules 1213. The light beam B1 that does not generate phase retardation sequentially passes through the at least one first polarizer 1231, the at least one compensation film 122 and the third polarizer 1233 and is emitted toward the display panel 14. A portion of the light beam B2 that generates phase retardation passes through the at least one first polarizer 1231, and the other portion is filtered by the at least one first polarizer 1231. The light beam B2 that passes through the at least one first polarizer 1231 generates phase retardation again after passing through the at least one compensation film 122 and is filtered by the third polarizer 1233, such that the viewing angle of the viewing angle controllable display apparatus 10 can be effectively limited.

Figure 2A:
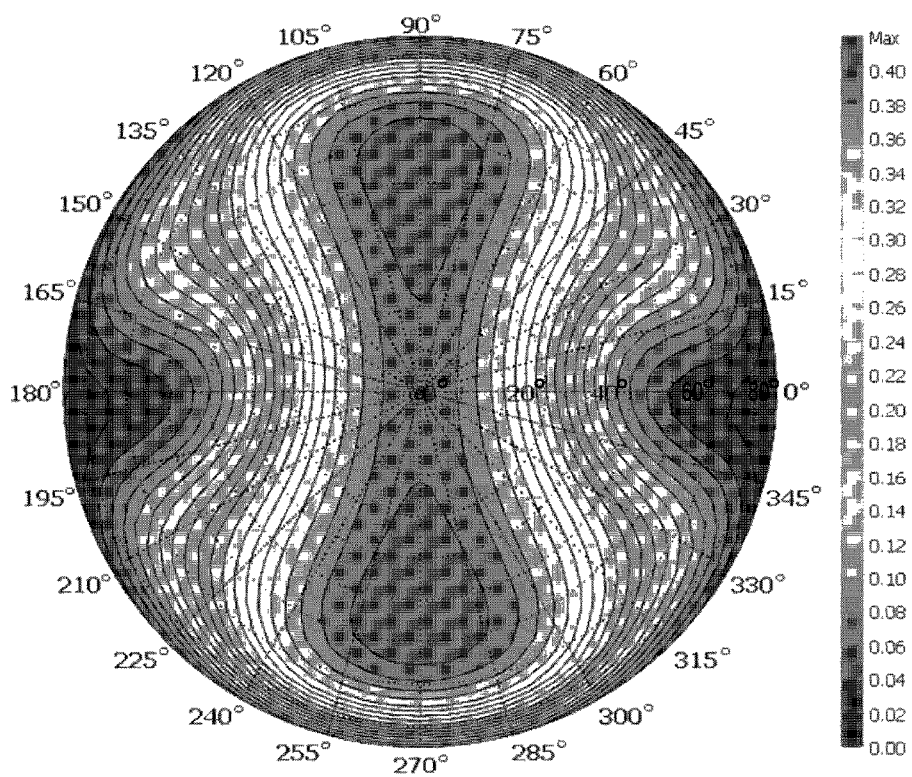
FIGS. 2A and 2B are schematic views respectively illustrating angle distributions that show the transmittance of different viewing angles of the viewing angle control device in the general display mode and the privacy protecting mode according to the first embodiment.
Figure 2B:
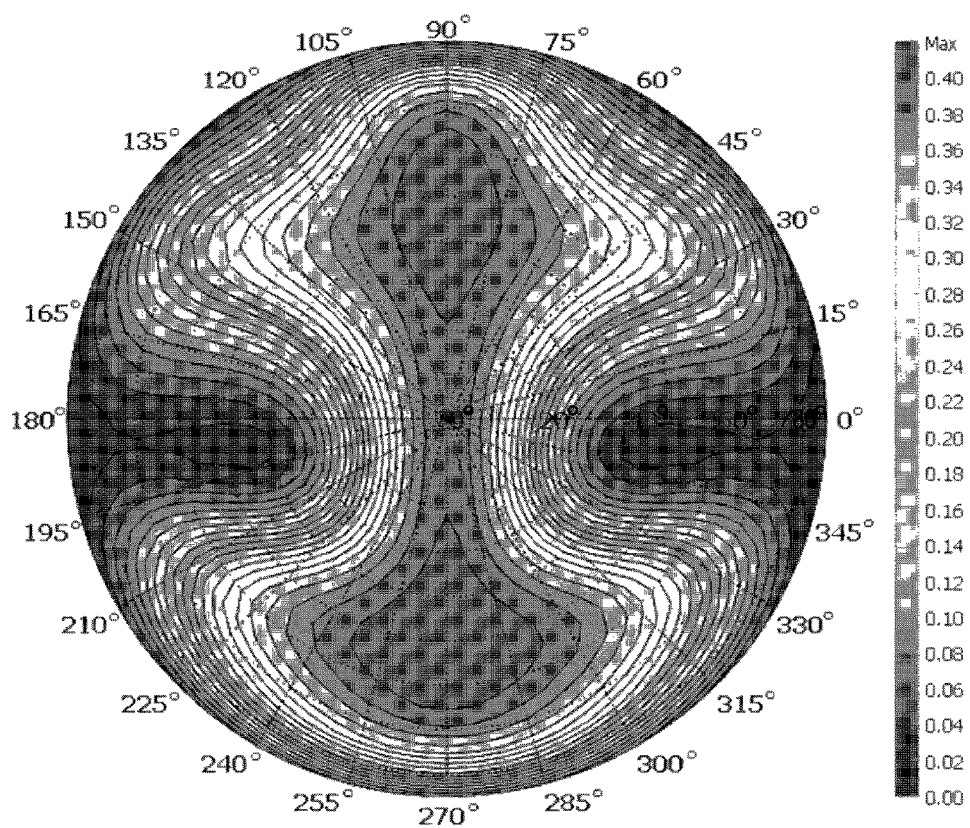

FIGS. 2A and 2B are schematic views respectively illustrating angle distributions that show the transmittance of different viewing angles of the viewing angle control device in the general display mode and the privacy protecting mode according to the first embodiment. In FIGS. 2A and 2B, azimuth angles 0° and 180° respectively represent a first direction D1 (referring to FIGS. 1A and 1B) and a reverse direction thereof; azimuth angles 90° and 270° respectively represent a second direction D2 (referring to FIGS. 1A and 1B) and a reverse direction thereof. FIGS. 2A and 2B show that, by changing the potential difference between the transparent conductive layer 1211 and the transparent conductive layer 1212, the viewing angle control device 12 can meet the requirement of limiting viewing angle (privacy protecting) in the first direction D1 and the reverse direction thereof. In addition, the viewing angle controllable display apparatus 10 using the viewing angle control device 12 can switch between the general display mode and the privacy protecting mode through the means of electrical control, thereby saving the trouble of having to manually placing/removing the control film for the user in the conventional technique.

Figure 3A:
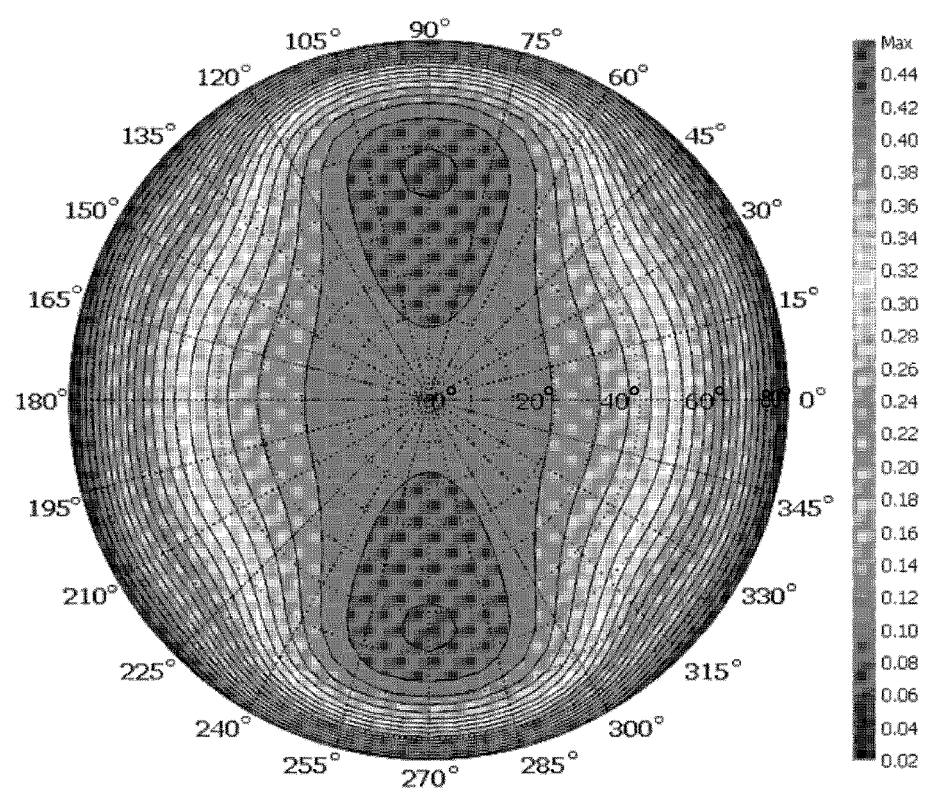
FIGS. 3A and 3B are schematic views respectively illustrating angle distributions that show the transmittance of different viewing angles of the viewing angle control device in the general display mode and the privacy protecting mode according to a comparative example.
Figure 3B:
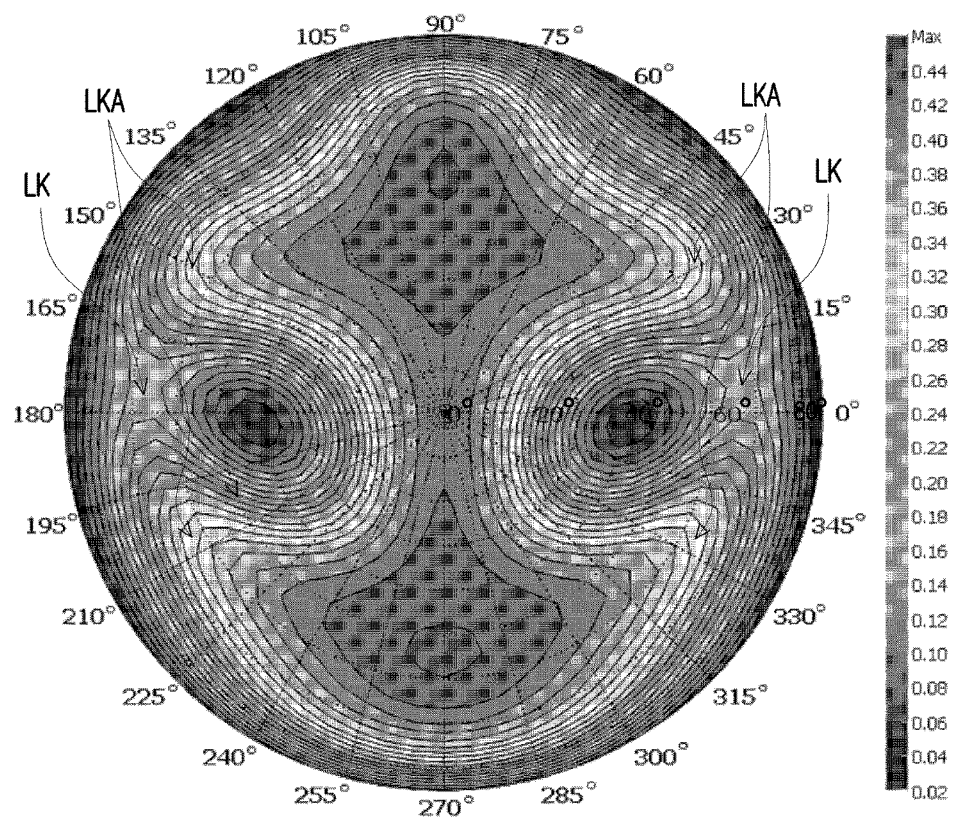

FIGS. 3A and 3B are schematic views respectively illustrating angle distributions that show the transmittance of different viewing angles of the viewing angle control device in general display mode and the privacy protecting mode according to the comparative example. The difference between the viewing angle control device in the comparative example and the viewing angle control device 12 in FIGS. 1A and 1B lies in that the viewing angle control device in the comparative example does not include the at least one compensation film 122 and the third polarizer 1233. Based on a comparison between FIGS. 2B and 3B, it is shown that, as compared with the comparative example where only the liquid crystal panel and the polarizer are used to limit the viewing angle, the viewing angle control device 12 in the embodiment can improve large angle light leakage LK in FIG. 3B and more effectively achieve the effect of large angle privacy protecting by utilizing the configuration of the at least one liquid crystal panel 121, the at least one compensation film 122 and the set 123 of the plurality of polarizers.

FIGS. 4-9 are sectional schematic views respectively illustrating other viewing angle controllable display apparatus in the general display mode according to the first embodiment of the invention. Please refer to the descriptions regarding FIG. 1B for the details of privacy protecting mode of the viewing angle controllable display apparatus in FIGS. 4-9, which will not be repeated therein.

Figure 4:
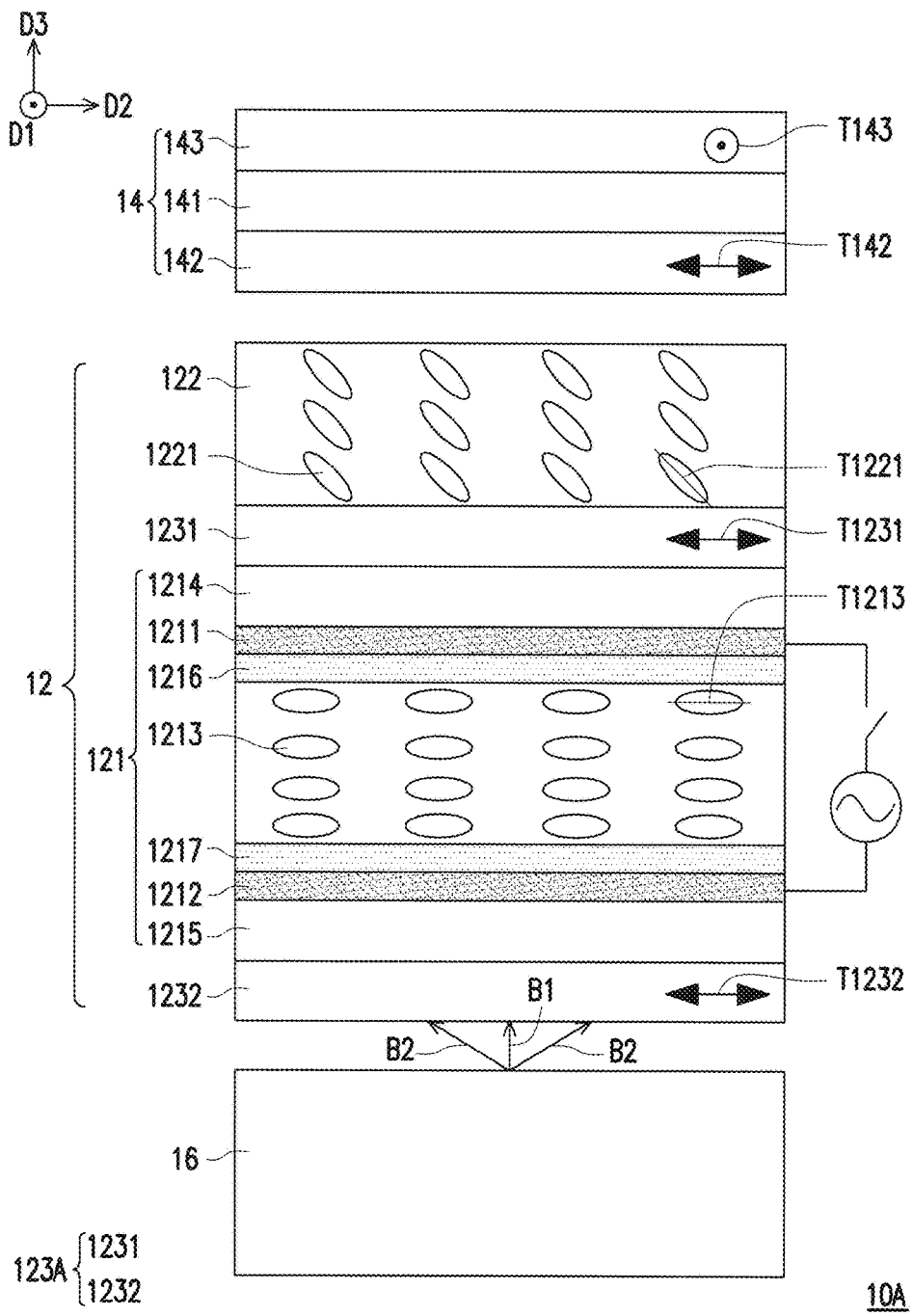
FIGS. 4-9 are sectional schematic views respectively illustrating other viewing angle controllable display apparatuses in the general display mode according to the first embodiment of the invention.

Referring to FIG. 4, a viewing angle controllable display apparatus 10A is similar to the viewing angle controllable display apparatus 10 in FIG. 1A, wherein identical elements are denoted by the same reference numerals, which will not be repeated therein. The main difference between the viewing angle controllable display apparatus 10A and the viewing angle controllable display apparatus 10 lies in that the set 123A of the plurality of the polarizers of the viewing angle controllable display apparatus 10A omits the third polarizer 1233 in FIG. 1A.

Figure 5:
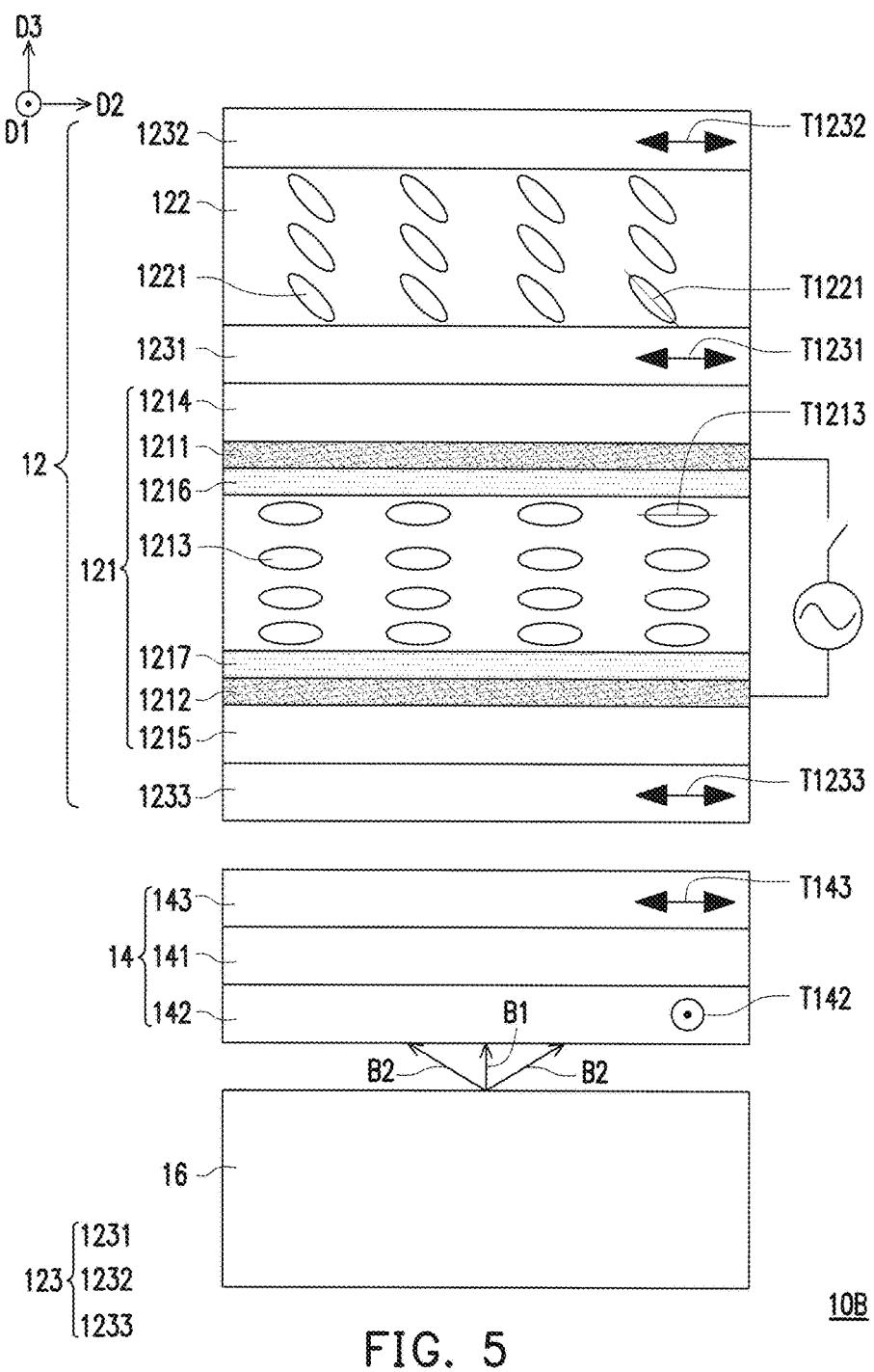

Referring to FIG. 5, a viewing angle controllable display apparatus 10B is similar to the viewing angle controllable display apparatus 10 in FIG. 1A, wherein identical elements are denoted by the same reference numerals, which will not be repeated therein. The main differences between the viewing angle controllable display apparatus 10B and the viewing angle controllable display apparatus 10 are described below. In the viewing angle controllable display apparatus 10B, the display panel 14 is located between the viewing angle control device 12 and backlight module 16. The third polarizer 1233 of the viewing angle control device 12 is adjacent to the light-emitting surface polarizer 143 of the display panel 14. The transmission axis T1233 of the third polarizer 1233 is parallel to the transmission axis T143 of the light-emitting surface polarizer 143, such that the light beam from the light-emitting surface polarizer 143 passes through the third polarizer 1233, which should not be construed as a limitation to the invention. In another embodiment, the transmission axis T143 of the light-emitting surface polarizer 143 may also be perpendicular to the transmission axis T1233 of the third polarizer 1233, and a half wave plate is disposed between the light-emitting surface polarizer 143 and the third polarizer 1233.

Figure 6:
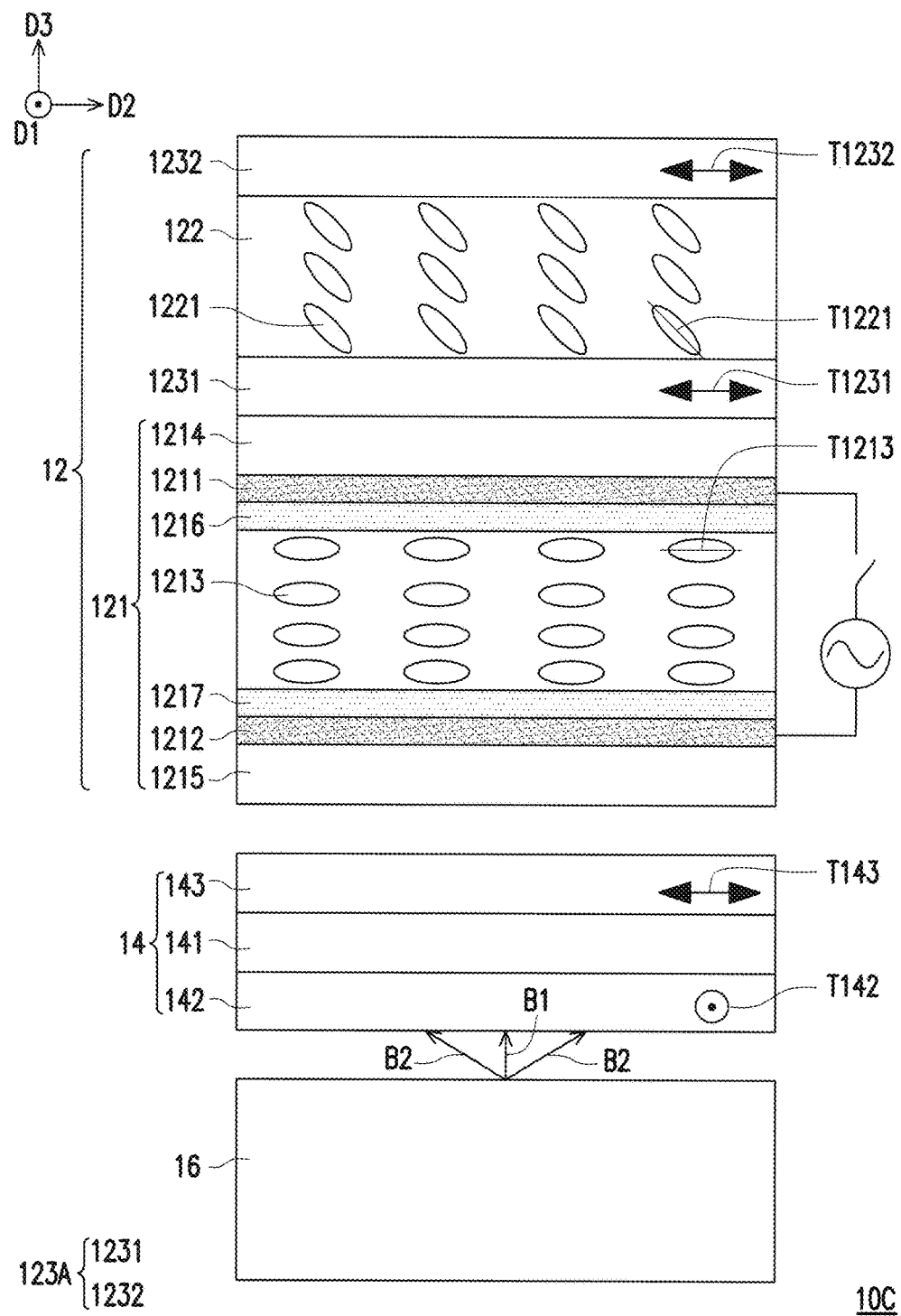

Referring to FIG. 6, a viewing angle controllable display apparatus 10C is similar to the viewing angle controllable display apparatus 10B in FIG. 5, wherein identical elements are denoted by the same reference numerals, which will not be repeated therein. The main difference between the viewing angle controllable display apparatus 10C and the viewing angle controllable display apparatus 10B lies in that the plurality of polarizers (the set of the plurality of polarizers is denoted by 123A) of the viewing angle controllable display apparatus 10C omit the third polarizer 1233 in FIG. 5.

Figure 7:
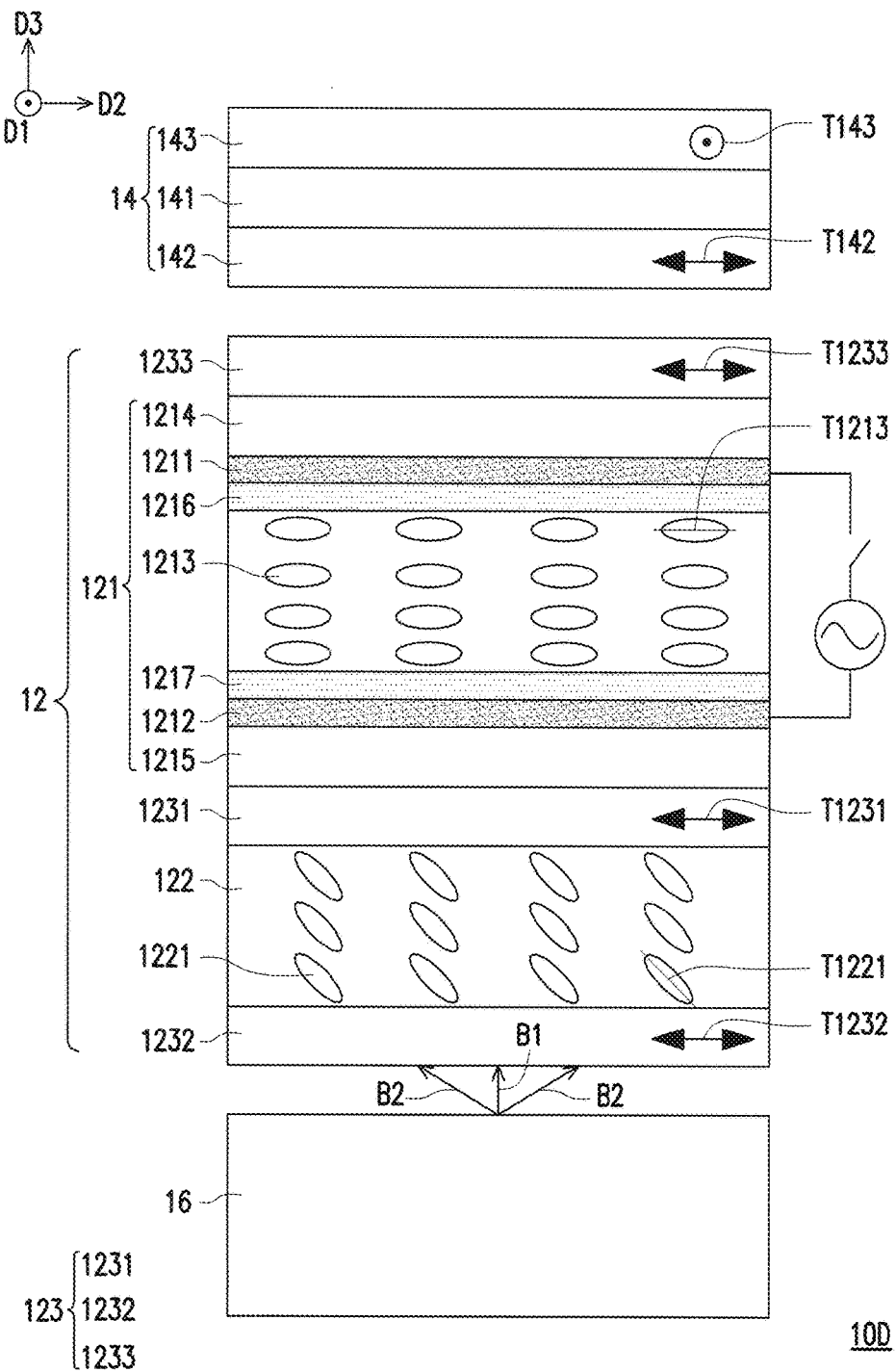

Referring to FIG. 7, a viewing angle controllable display apparatus 10D is similar to the viewing angle controllable display apparatus 10 in FIG. 1A, wherein identical elements are denoted by the same reference numerals, which will not be repeated therein. The main difference between the viewing angle controllable display apparatus 10D and the viewing angle controllable display apparatus 10 lies in that the position of the at least one liquid crystal panel 121 and the position of the at least one compensation film 122 are switched.

Figure 8:
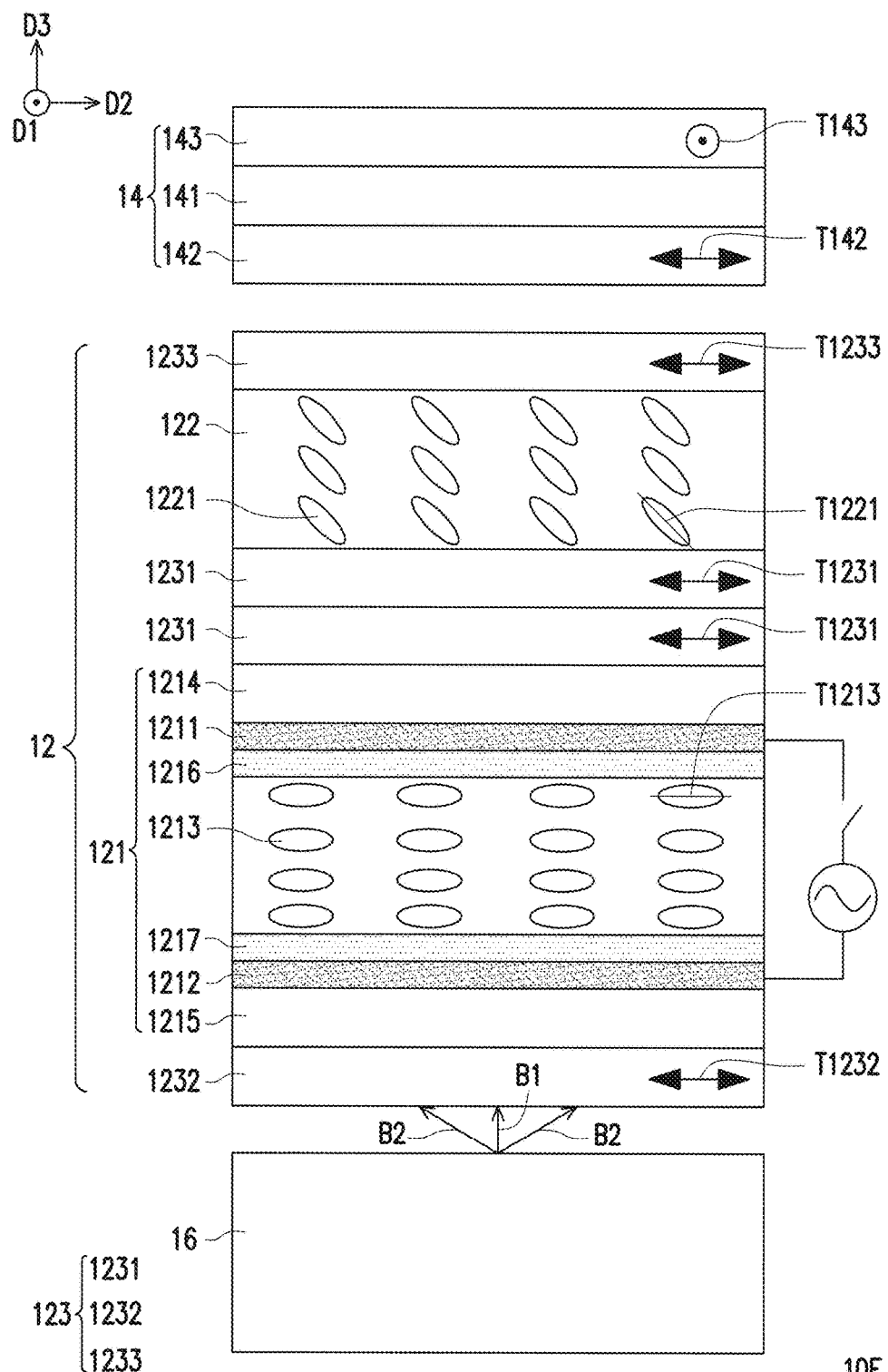

Referring to FIG. 8, a viewing angle controllable display apparatus 10E is similar to the viewing angle controllable display apparatus 10 in FIG. 1A, wherein identical elements are denoted by the same reference numerals, which will not be repeated therein. The main difference between the viewing angle controllable display apparatus 10E and the viewing angle controllable display apparatus 10 lies in that an amount of the at least one first polarizer 1231 is two. The two first polarizers 1231 are located between the at least one liquid crystal panel 121 and the at least one compensation film 122. The transmission axes T1231 of the two first polarizers 1231, the transmission axis T1232 of the second polarizer 1232 and the transmission axis T1233 of the third polarizer 1233 are parallel to each other.

Figure 9:
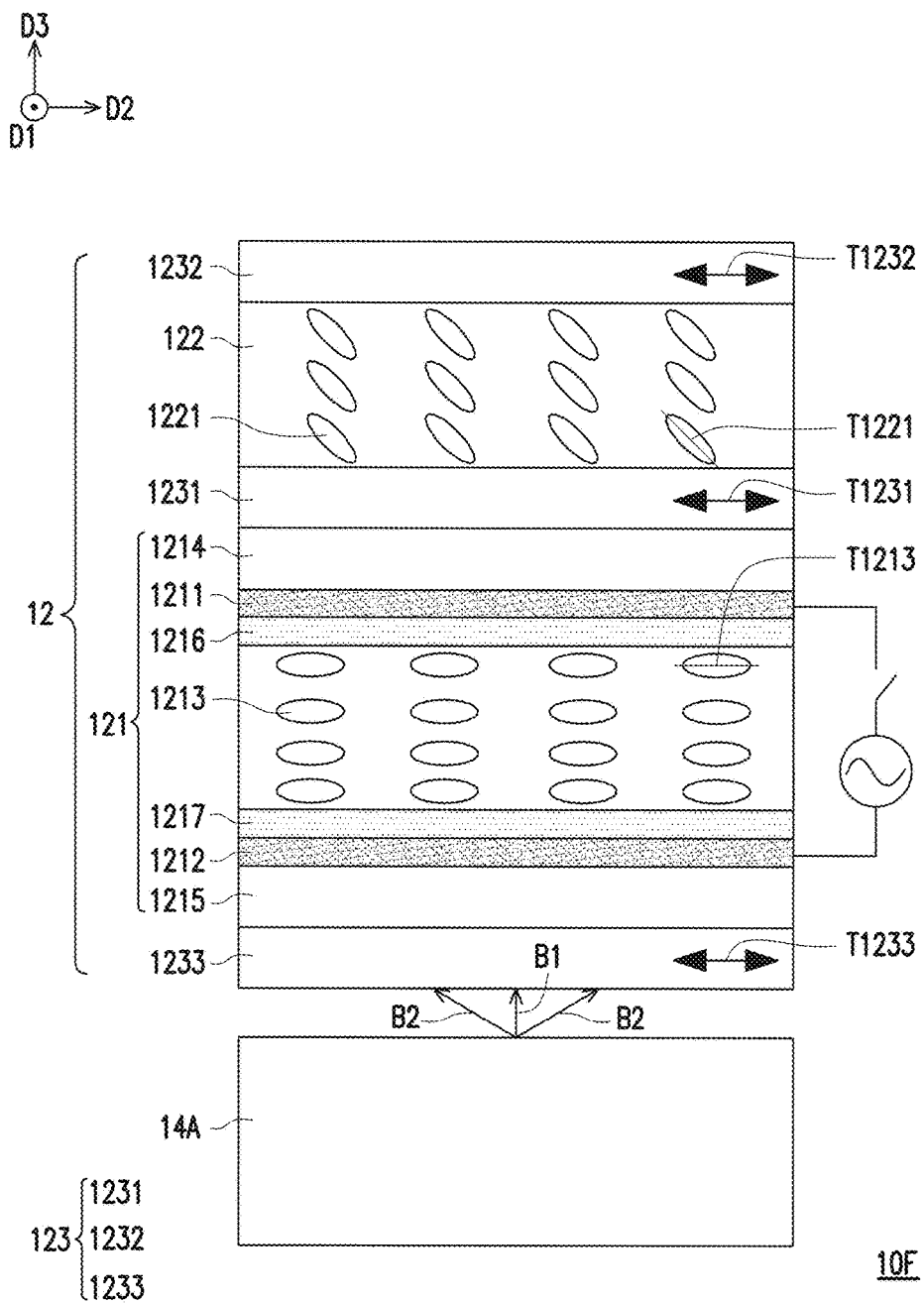

Referring to FIG. 9, a viewing angle controllable display apparatus 10F is similar to the viewing angle controllable display apparatus 10B in FIG. 5, wherein identical elements are denoted by the same reference numerals, which will not be repeated therein. The main difference between the viewing angle controllable display apparatus 10F and the viewing angle controllable display apparatus 10B lies in that a display panel 14A of the viewing angle controllable display apparatus 10F is an organic light emitting diode display panel, and the viewing angle controllable display apparatus 10F omits the backlight module 16 in FIG. 5.

Figure 10:
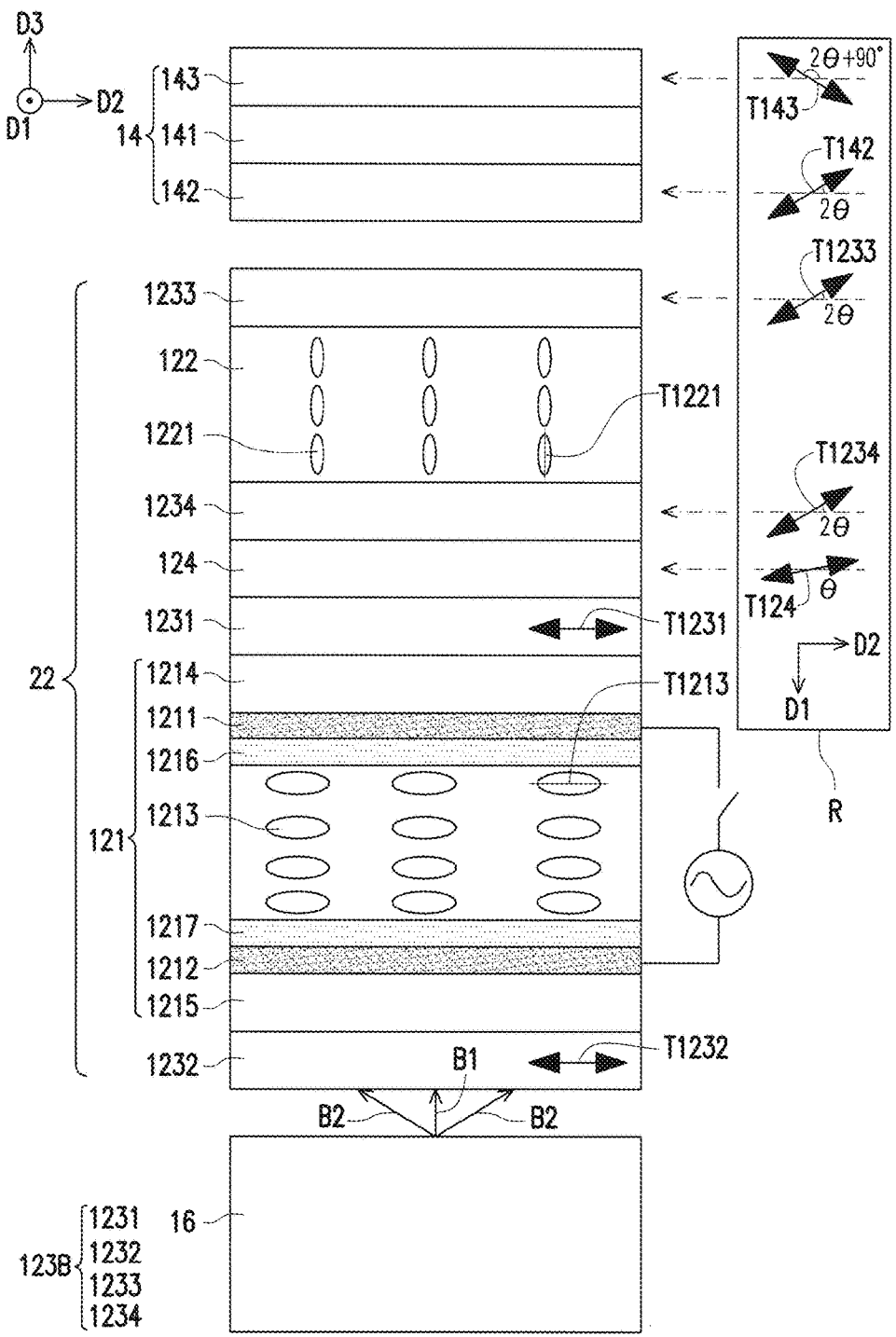
FIG. 10 is a sectional schematic view illustrating a viewing angle controllable display apparatus in the general display mode according a second embodiment of the invention.
Figure 10A:
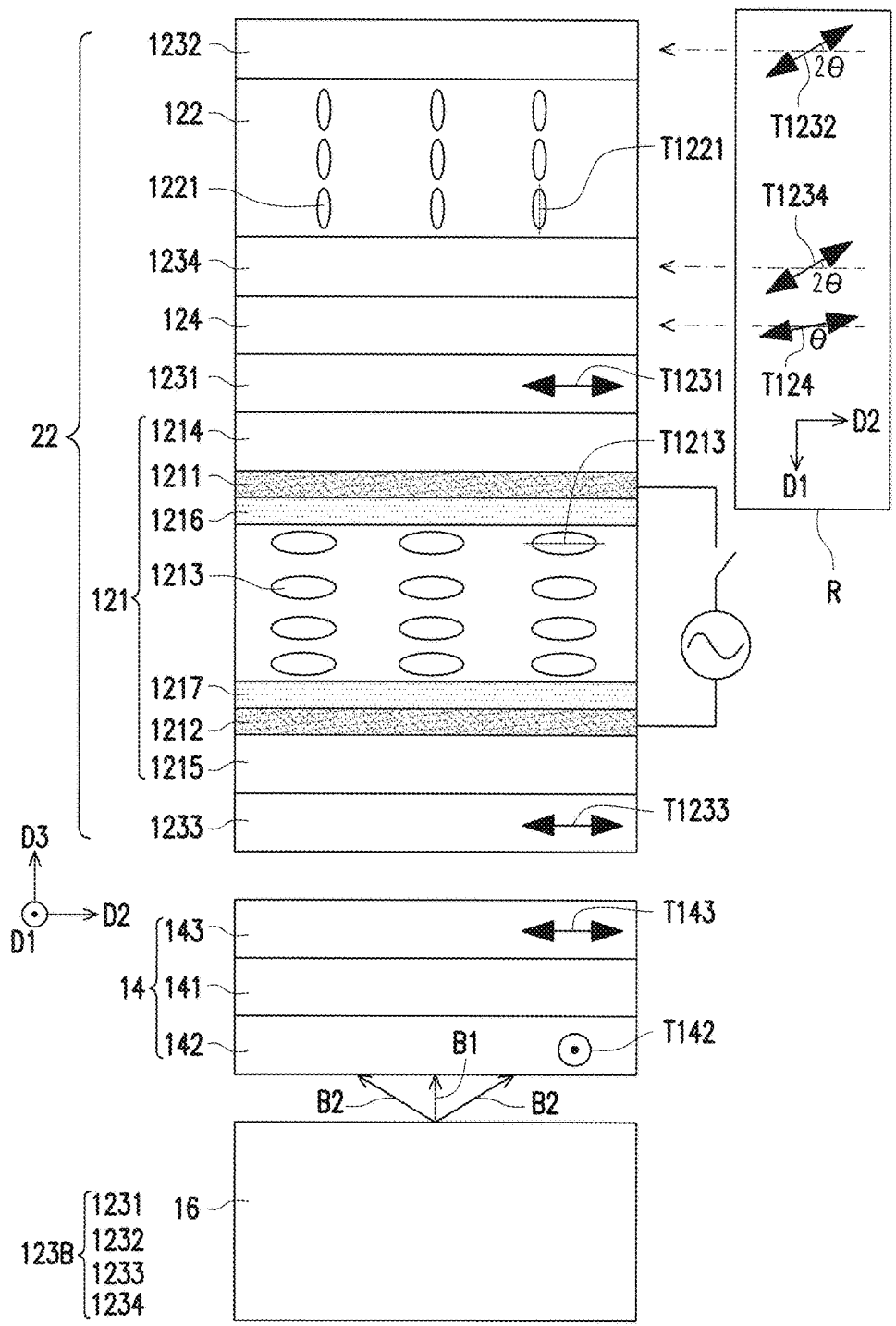
FIG. 10A is a sectional schematic view illustrating another viewing angle controllable display apparatus in the general display mode according to the second embodiment of the invention.

FIG. 10 is a sectional schematic view illustrating a viewing angle controllable display apparatus in the general display mode according a second embodiment of the invention. FIG. 10A is a sectional schematic view illustrating another viewing angle controllable display apparatus in the general display mode according to the second embodiment of the invention. Please refer to FIG. 1B for the details of privacy protecting mode of the viewing angle controllable display apparatus in FIGS. 10 and 10A, which will not be repeated therein.

Referring to FIG. 10, a viewing angle controllable display apparatus 20 is similar to the viewing angle controllable display apparatus 10 in FIG. 1A, wherein identical elements are denoted by the same reference numerals, which will not be repeated therein. The main difference between the viewing angle controllable display apparatus 20 and the viewing angle controllable display apparatus 10 is described below. In the viewing angle controllable display apparatus 20, the at least one compensation film 122 is a C-plate, and the optical axis T1221 of the liquid crystal polymer 1221 is perpendicular to the substrate 1214. In addition, the viewing angle control device 22 further includes at least one half wave plate 124. The at least one half wave plate 124 is located between the at least one compensation film 122 and the at least one first polarizer 1231, wherein an included angle between a slow axis T124 of the at least one half wave plate 124 and the transmission axis T1231 of the at least one first polarizer 1231 on a reference plane R is θ (dashed lines represent the projection of transmission axis T1231 of the at least one first polarizer 1231 on the reference plane R). The reference plane R is parallel to the at least one first polarizer 1231, and the reference plane R is, for example, a plane constituted by the first direction D1 and the second direction D2.

In the embodiment, the viewing angle control device 22 is located between the display panel 14 and backlight module 16. The transmission axis T1231 of the at least one first polarizer 1231 and the transmission axis T1232 of the second polarizer 1232 are parallel to each other. An included angle between the transmission axis T1233 of the third polarizer 1233 and the transmission axis T1231 of the at least one first polarizer 1231 on the reference plane R is 2θ. The included angle θ may be 22.5°±15° or 62.5°±15°, such that the included angle between the transmission axis T1233 of the third polarizer 1233 and the second direction D2 is 45 degrees or 125 degrees, so that the effect of limiting viewing angle in the first direction D1 can be more effectively achieved.

The polarizers (the set of the plurality of polarizers is denoted by 123B) not only include the at least one first polarizer 1231, the second polarizer 1232 and the third polarizer 1233, but also may include at least one fourth polarizer 1234. The at least one fourth polarizer 1234 is located between the at least one compensation film 122 and the at least one half wave plate 124. An included angle between the transmission axis T1234 of the at least one fourth polarizer 1234 and the transmission axis T1231 of the at least one first polarizer 1231 on the reference plane R is 2θ. In another embodiment, the at least one fourth polarizer 1234 may be omitted.

In the embodiment, the transmission axis T142 of the light-incident surface polarizer 142 and the transmission axis T1233 of the third polarizer 1233 are parallel to each other, such that the light beam from the third polarizer 1233 can pass through the light-incident surface polarizer 142. In other words, an included angle between the transmission axis T142 of the light-incident surface polarizer 142 and the transmission axis T1231 of the at least one first polarizer 1231 on the reference plane R is 2θ. In another embodiment, one of the third polarizer 1233 and the light-incident surface polarizer 142 may be omitted. In yet another embodiment, an included angle may be formed between the transmission axis T142 of the light-incident surface polarizer 142 and the transmission axis T1233 of the third polarizer 1233 on the reference plane R. Meanwhile, a half wave plate is disposed between the third polarizer 1233 and the light-incident surface polarizer 142 to adjust the polarization direction of the incident light so as to avoid that the incident light is absorbed by the light-incident surface polarizer 142.

In the embodiment, the transmission axis T143 of the light-emitting surface polarizer 143 and the transmission axis T142 of the light-incident surface polarizer 142 are perpendicular to each other. In other words, an included angle between the transmission axis T143 of the light-emitting surface polarizer 143 and the transmission axis T1231 of the at least one first polarizer 1231 on the reference plane R is 2θ+90°. However, in another embodiment, the transmission axis T143 of the light-emitting surface polarizer 143 and the transmission axis T142 of the light-incident surface polarizer 142 may be parallel to each other.

Referring to FIG. 10A, a viewing angle controllable display apparatus 20A is similar to the viewing angle controllable display apparatus 20 in FIG. 10, wherein identical elements are denoted by the same reference numerals, which will not be repeated therein. The main difference between the viewing angle controllable display apparatus 20A and the viewing angle controllable display apparatus 20 in FIG. 10 is described below. In the viewing angle controllable display apparatus 20A, the display panel 14 is located between the viewing angle control device 22 and backlight module 16. With such configuration, the transmission axis T1231 of the at least one first polarizer 1231 and the transmission axis T1233 of the third polarizer 1233 are parallel to each other. An included angle between the transmission axis T1232 of the second polarizer 1232 and the transmission axis T1231 of the at least one first polarizer 1231 on the reference plane R is 2θ.

The polarizers (the set of the plurality of polarizers is denoted by 123B) may also further include at least one fourth polarizer 1234. The at least one fourth polarizer 1234 is located between the at least one compensation film 122 and the at least one half wave plate 124. An included angle between the transmission axis T1234 of the at least one fourth polarizer 1234 and the transmission axis T1231 of the at least one first polarizer 1231 on the reference plane R is 2θ. In another embodiment, the at least one fourth polarizer 1234 may be omitted.

Figure 11A:
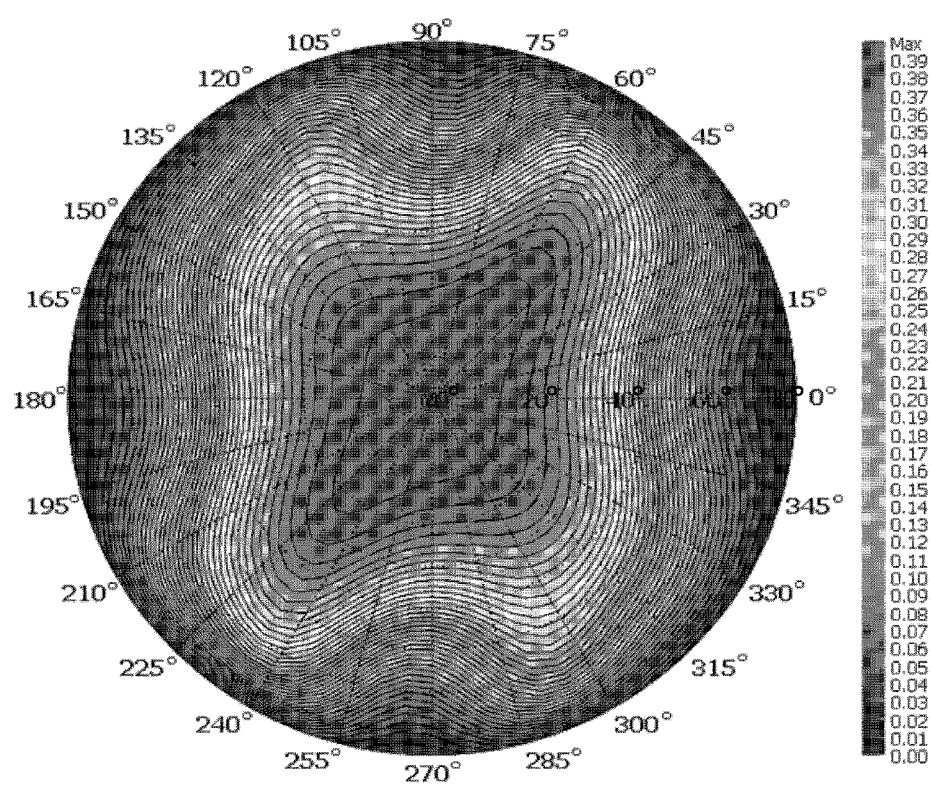
FIGS. 11A and 11B are schematic views respectively illustrating angle distributions that show the transmittance of different viewing angles of the viewing angle control device in the general display mode and the privacy protecting mode according to the second embodiment.
Figure 11B:
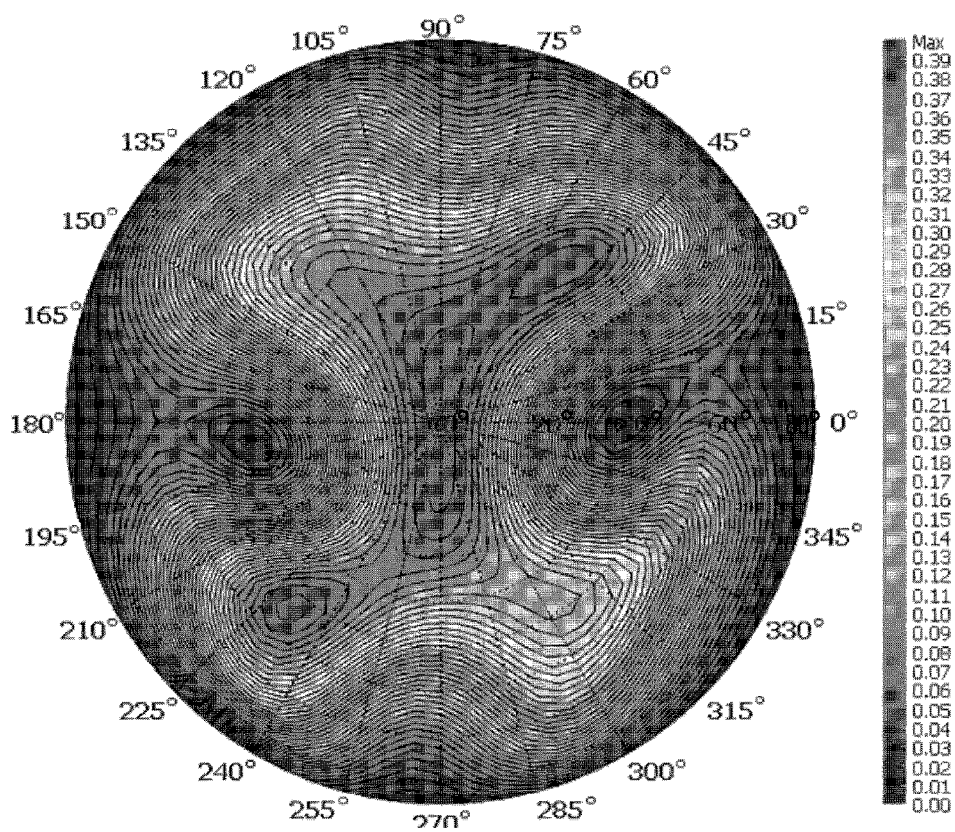

FIGS. 11A and 11B are schematic views respectively illustrating angle distributions that show the transmittance of different viewing angles of the viewing angle control device in the general display mode and the privacy protecting mode according to the second embodiment. FIGS. 11A and 11B show that, by changing the potential difference between the transparent conductive layer 1211 and the transparent conductive layer 1212, the viewing angle control device 22 may meet the requirement of limiting viewing angle (privacy protecting) in the first direction D1 and a reverse direction thereof (see the azimuth angles 0° and 180°). Moreover, the viewing angle controllable display apparatus 20 using the viewing angle control device 22 can switch between the general display mode and the privacy protecting mode through the means of electrical control, thereby saving the trouble of having to manually placing/removing the light control film for the user in the conventional technique. In addition, a comparison between FIG. 11B and FIG. 3B shows that, as compared with the comparative example where only the liquid crystal panel and the polarizer are used to limit the viewing angle, the viewing angle control device 22 in the embodiment can improve large angle light leakage LK in FIG. 3B and more effectively achieve the effect of large angle protecting privacy by utilizing the configuration of the at least one liquid crystal panel 121, the at least one compensation film 122, the set 123B of the plurality of polarizers and the at least one half wave plate 124.

Figure 12:
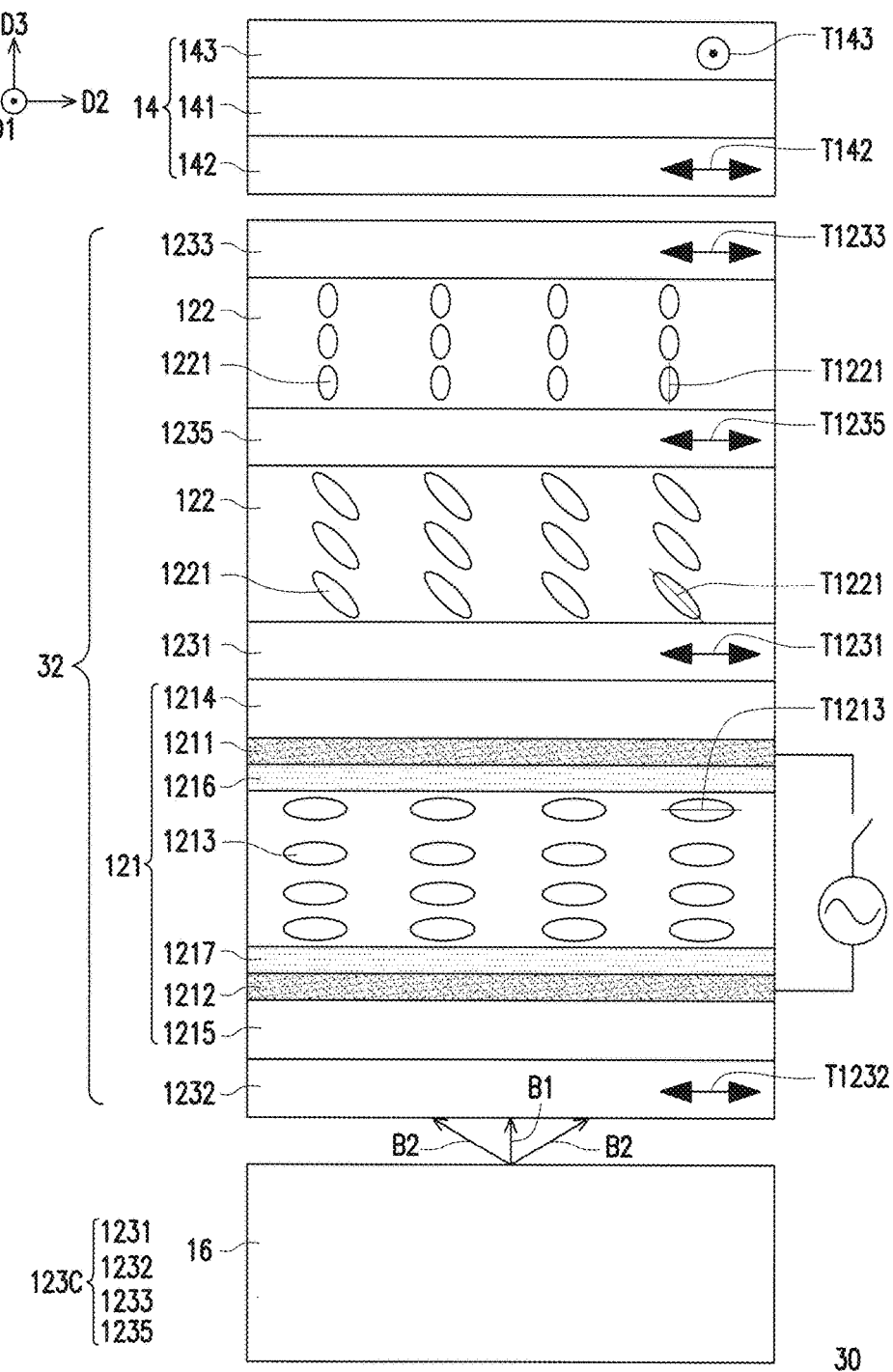
FIG. 12 is a sectional schematic view illustrating a viewing angle controllable display apparatus in the general display mode according to a third embodiment of the invention.

FIG. 12 is a sectional schematic view illustrating a viewing angle controllable display apparatus in the general display mode according to a third embodiment of the invention. Please refer to the descriptions concerning FIG. 1B for the details of privacy protecting mode of the viewing angle controllable display apparatus in FIG. 12, which will not be repeated therein.

Referring to FIG. 12, a viewing angle controllable display apparatus 30 is similar to the viewing angle controllable display apparatus 10 in FIG. 1A, wherein identical elements are denoted by the same reference numerals, which will not be repeated therein. The main difference between the viewing angle controllable display apparatus 30 and the viewing angle controllable display apparatus 10 is described below. In the viewing angle controllable display apparatus 30, an amount of the at least one compensation film 122 is two. The two compensation films 122 are, for example, the O-plate (the optical axis T1221 of the liquid crystal polymer 1221 is inclined with respect to the substrate 1214) and the C-plate (the optical axis T1221 of the liquid crystal polymer 1221 is perpendicular to the substrate 1214) respectively, which should not be construed as a limitation to the invention. The O-plate is located, for example, between the C-plate and the at least one liquid crystal panel 121, which should not be construed as a limitation to the invention. In another embodiment, the positions of the O-plate and C-plate may be switched.

The plurality of polarizers (the set of the plurality of polarizers is denoted by 123C) not only include the at least one first polarizer 1231, the second polarizer 1232 and the third polarizer 1233, but also include at least one fifth polarizer 1235. The at least one fifth polarizer 1235 is located between the two compensation films 122, wherein the transmission axis T1231 of the at least one first polarizer 1231, the transmission axis T1232 of the second polarizer 1232, the transmission axis T1233 of the third polarizer 1233 and the transmission axis T1235 of the at least one fifth polarizer 1235 are parallel to each other.

Figure 13A:
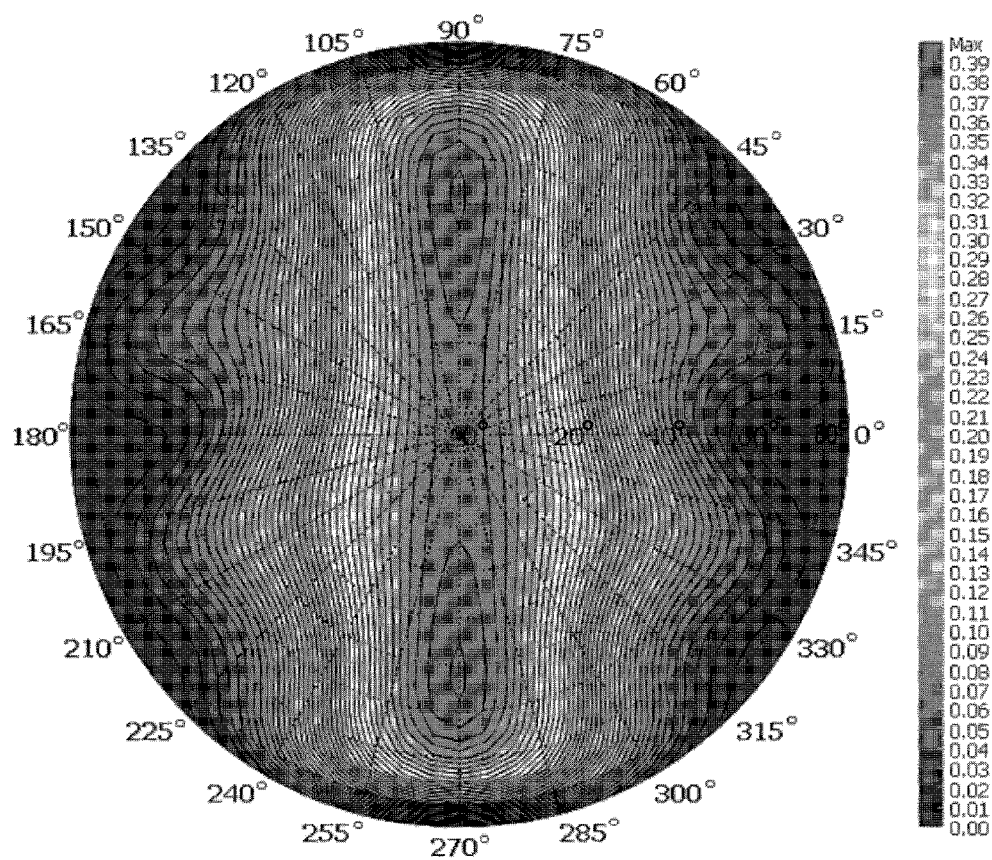
FIGS. 13A and 13B are schematic views respectively illustrating angle distributions that show the transmittance of different viewing angles of the viewing angle control device in the general display mode and the privacy protecting mode according to the third embodiment.
Figure 13B:
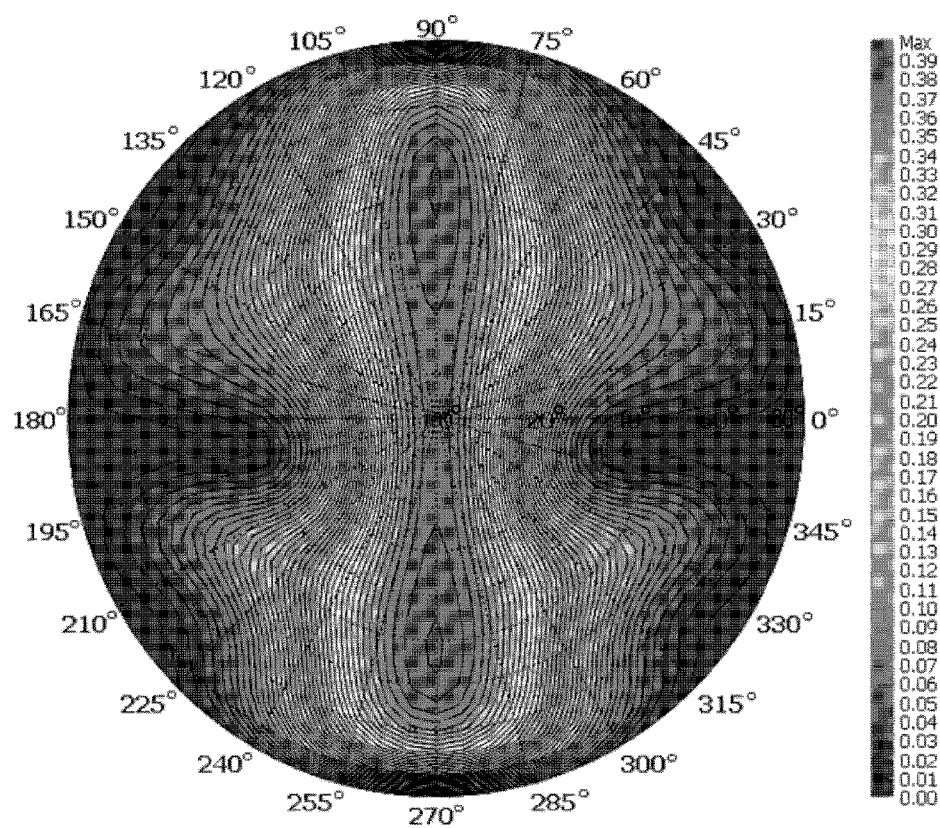

FIGS. 13A and 13B are schematic views respectively illustrating angle distributions that show the transmittance of different viewing angles of the viewing angle control device in the general display mode and the privacy protecting mode according to the third embodiment. FIGS. 13A and 13B show that, by changing the potential difference between the transparent conductive layer 1211 and the transparent conductive layer 1212, the viewing angle control device 32 can meet the requirement of limiting viewing angle (privacy protecting) in the first direction D1 and a reverse direction thereof (see azimuth angles 0° and 180°). In addition, the viewing angle controllable display apparatus 30 using the viewing angle control device 32 can switch between the general display mode and the privacy protecting mode through the means of electrical control, thereby saving the trouble of having to manually placing/removing the light control film for the user in the conventional technique. In addition, a comparison between FIG. 13B and FIG. 3B shows that, as compared with the comparative example where only the liquid crystal panel and the polarizer are used to limit the viewing angle, the viewing angle control device 32 in the embodiment not only can improve the large angle light leakage LK in the direction of azimuth angles 0° and 180° in FIG. 3B by utilizing the configuration of the at least one liquid crystal panel 121, the two compensation films 122 and the set 123C of the plurality of polarizers, but also can reduce large angle light leakage LKA in azimuth angles 0°±45° and 180°±45° at the same time, such that the effect of large angle protecting privacy can be achieved more effectively.

Figure 14:
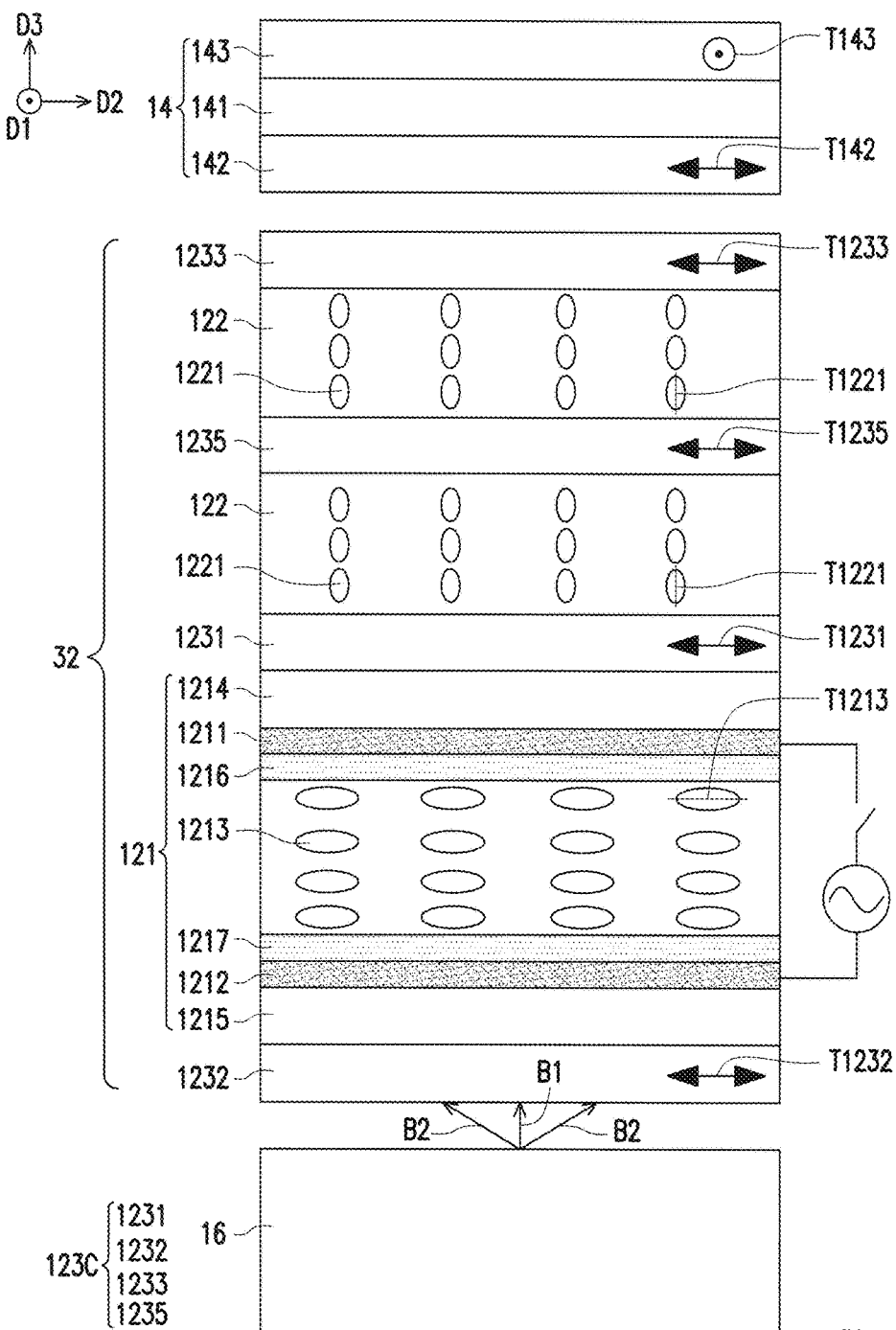
FIGS. 14 and 15 are sectional schematic views respectively illustrating other viewing angle controllable display apparatuses in the general display mode according to the third embodiment of the invention.
Figure 15:
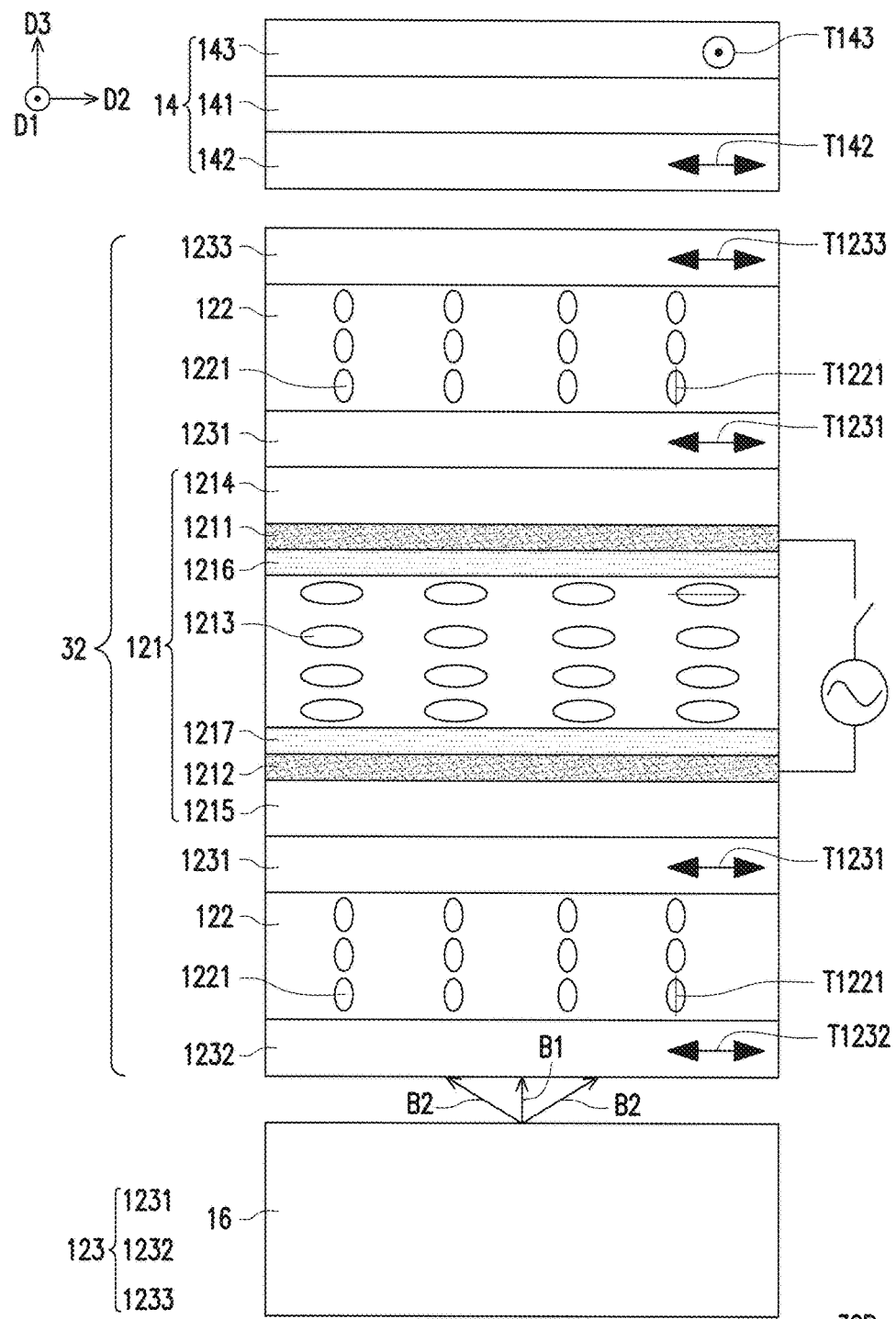

FIGS. 14 and 15 are sectional schematic views respectively illustrating other viewing angle controllable display apparatuses in the general display mode according to the third embodiment of the invention. Please refer to the descriptions of FIG. 1B for details about privacy mode of the viewing angle controllable display apparatus in FIGS. 14-15, which will not be repeated therein.

Referring to FIG. 14, a viewing angle controllable display apparatus 30A is similar to the viewing angle controllable display apparatus 30 in FIG. 12, wherein identical elements are denoted by the same reference numerals, which will not be repeated therein. The main difference between the viewing angle controllable display apparatus 30A and the viewing angle controllable display apparatus 30 lies in that the two compensation films 122 in the viewing angle controllable display apparatus 30A are both C-plates, which should not be construed as a limitation to the invention. In another embodiment, the two compensation films 122 may also be O-plates.

Referring to FIG. 15, a viewing angle controllable display apparatus 30B is similar to the viewing angle controllable display apparatus 30A in FIG. 14, wherein identical elements are denoted by the same reference numerals, which will not be repeated therein. The main difference between the viewing angle controllable display apparatus 30B and the viewing angle controllable display apparatus 30A is described below. In the viewing angle controllable display apparatus 30B, the two compensation films 122 are respectively disposed on two opposite sides of the at least one liquid crystal panel 121. The polarizer 123 omits the at least one fifth polarizer 1235 in FIG. 14, and the amount of the at least one first polarizer 1231 is two. Each of the first polarizers 1231 is located between one of the compensation films 122 and the at least one liquid crystal panel 121.

Figure 16:
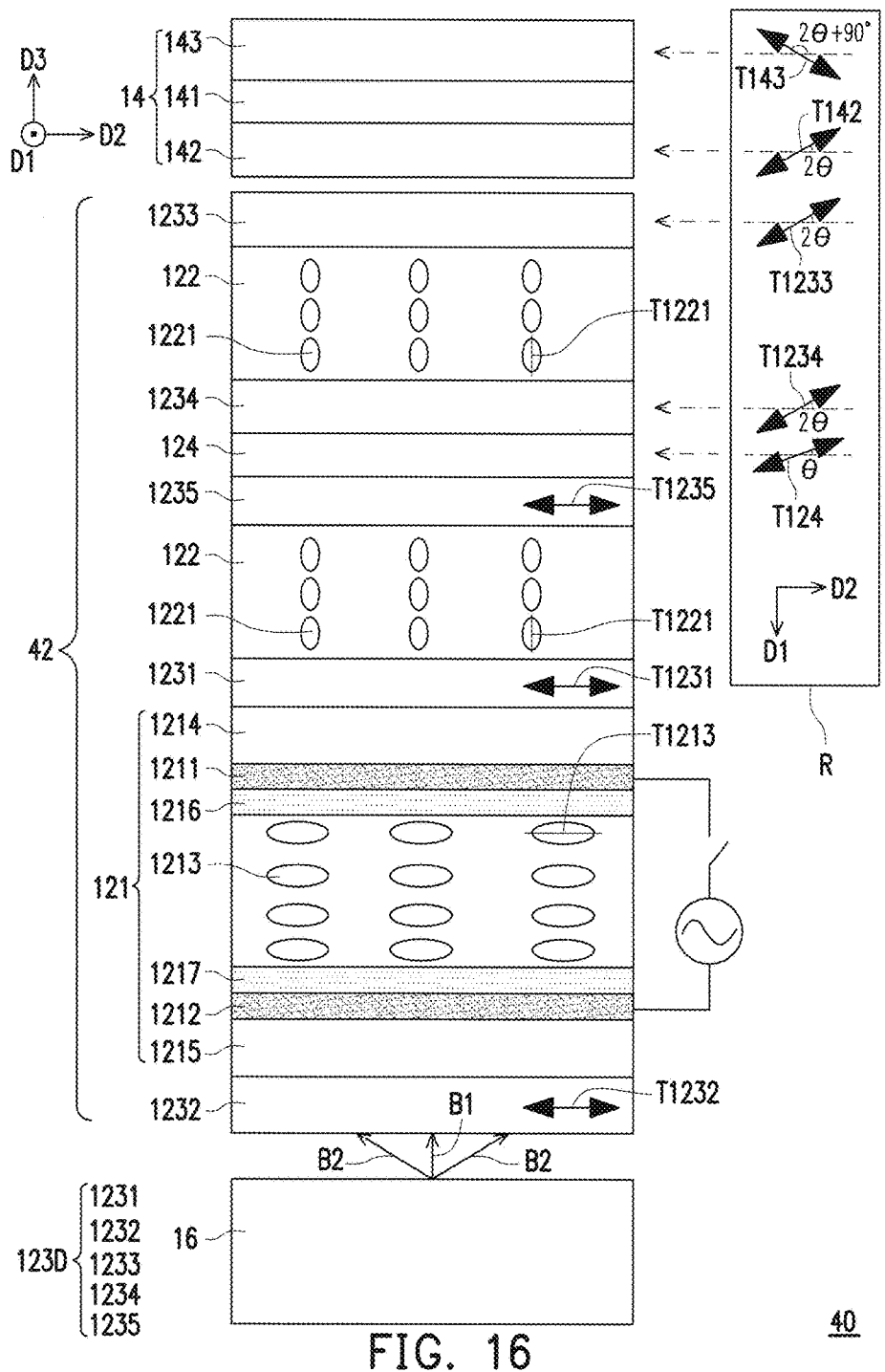
FIG. 16 is a sectional schematic views illustrating a viewing angle controllable display apparatus in the general display mode according to a fourth embodiment of the invention.
Figure 16A:
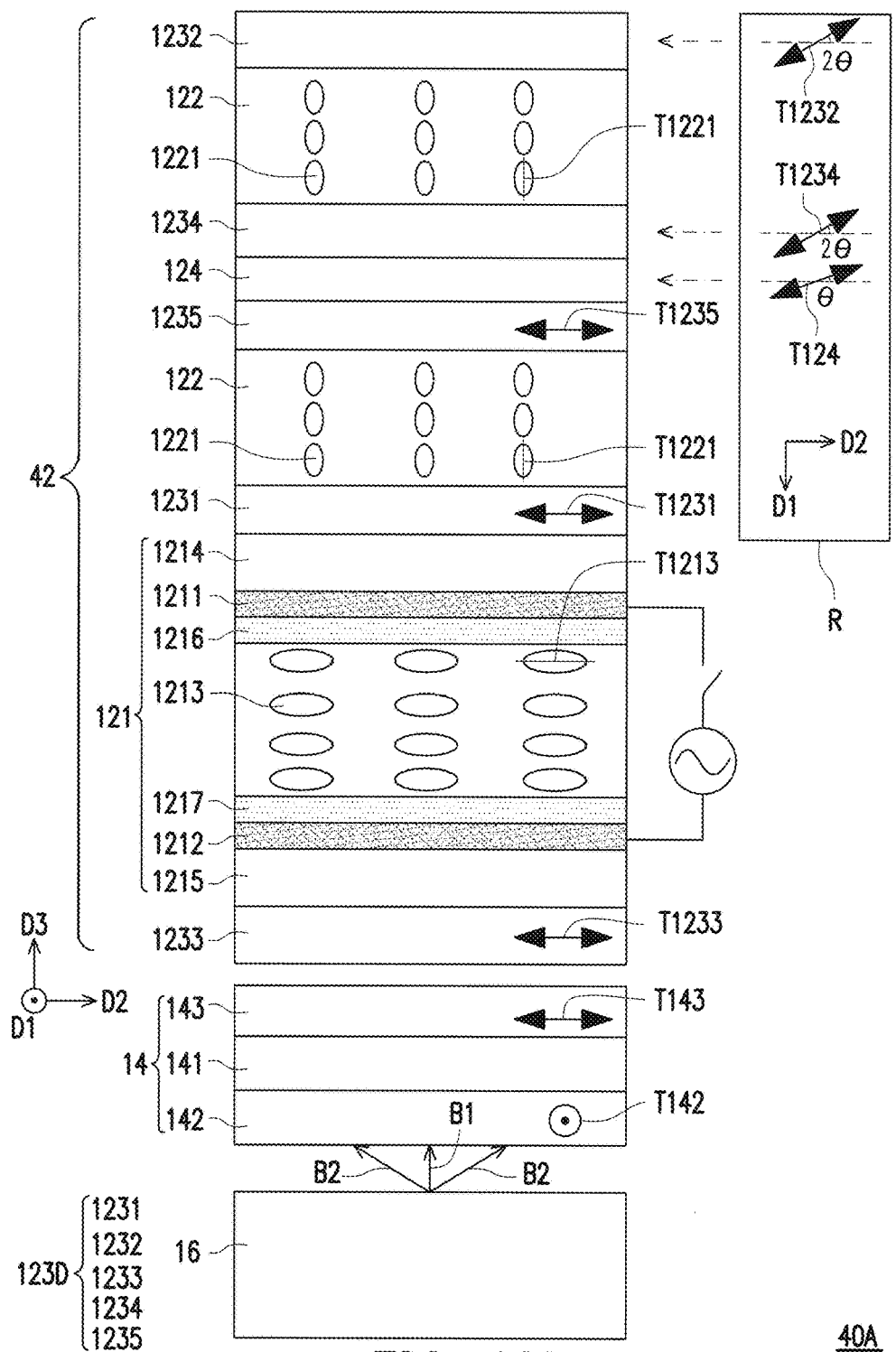
FIG. 16A is a sectional schematic view illustrating another viewing angle controllable display apparatus in the general display mode according to the fourth embodiment of the invention.

FIG. 16 is a sectional schematic views illustrating a viewing angle controllable display apparatus in the general display mode according to a fourth embodiment of the invention. FIG. 16A is a sectional schematic view illustrating another viewing angle controllable display apparatus in the general display mode according to the fourth embodiment of the invention. Please refer to descriptions of FIG. 1B for details about the privacy protecting mode of the viewing angle controllable display apparatus in FIG. 16 and FIG. 16A, which will not be repeated therein.

Referring to FIG. 16, a viewing angle controllable display apparatus 40 is similar to the viewing angle controllable display apparatus 30A in FIG. 14, wherein identical elements are denoted by the same reference numerals, which will not be repeated therein. The main difference between the viewing angle controllable display apparatus 40 and the viewing angle controllable display apparatus 30A is described below. In the viewing angle controllable display apparatus 40, the viewing angle control device 42 further includes at least one half wave plate 124. The at least one half wave plate 124 is located between the at least one compensation film 122 and the at least one first polarizer 1231. The at least one fifth polarizer 1235 is located between the at least one half wave plate 124 and the at least one first polarizer 1231, wherein an included angle between a slow axis T124 of the at least one half wave plate 124 and the transmission axis T1231 of the at least one first polarizer 1231 on the reference plane R is $\theta$.

In the embodiment, the viewing angle control device 42 is located between the display panel 14 and backlight module 16. The transmission axis T1231 of the at least one first polarizer 1231, the transmission axis T1232 of the second polarizer 1232 and the transmission axis T1235 of the at least one fifth polarizer 1235 are parallel to each other. An included angle between the transmission axis T1233 of the third polarizer 1233 and the transmission axis T1231 of the at least one first polarizer 1231 on the reference plane R is $2\theta$. The included angle $\theta$ may be 22.5°±15° or 62.5°±15°, such that an included angle between the transmission axis T1233 of the third polarizer 1233 and the second direction D2 is 45° or 125°, thereby more effectively achieving the effect of limiting viewing angle in the first direction D1.

The polarizers (the set of the plurality of polarizers is denoted by 123D) not only include the at least one first polarizer 1231, the second polarizer 1232, the third polarizer 1233 and the at least one fifth polarizer 1235, but also may include at least one fourth polarizer 1234. The at least one fourth polarizer 1234 is located between the at least one compensation film 122 and the at least one half wave plate 124. Moreover, an included angle between the transmission axis T1234 of the at least one fourth polarizer 1234 and the transmission axis T1231 of the at least one first polarizer 1231 on the reference plane R is $2\theta$. In another embodiment, the at least one fourth polarizer 1234 may be omitted.

In the embodiment, the transmission axis T142 of the light-incident surface polarizer 142 and the transmission axis T1233 of the third polarizer 1233 are parallel to each other, such that the light beam from the third polarizer 1233 can pass through the light-incident surface polarizer 142. In other words, an included angle between the transmission axis T142 of the light-incident surface polarizer 142 and the transmission axis T1231 of the at least one first polarizer 1231 on the reference plane R is $2\theta$. In another embodiment, one of the third polarizer 1233 and the light-incident surface polarizer 142 may be omitted. In yet another embodiment, an included angle may be formed between the transmission axis T142 of the light-incident surface polarizer 142 and the transmission axis T1233 of the third polarizer 1233 on the reference plane R. Meanwhile, a half wave plate is disposed between the third polarizer 1233 and the light-incident surface polarizer 142 to adjust the polarization direction of the incident light so as to avoid that the incident light is absorbed by the light-incident surface polarizer 142.

In the embodiment, the transmission axis T143 of the light-emitting surface polarizer 143 and the transmission axis T142 of the light-incident surface polarizer 142 are perpendicular to each other. In other words, the included angle between the light-emitting surface polarizer 143 and the transmission axis T1231 of the at least one first polarizer 1231 on the reference plane R is $2\theta+90°$. However, in another embodiment, the transmission axis T143 of the light-emitting surface polarizer 143 and the transmission axis T142 of the light-incident surface polarizer 142 may be parallel to each other.

Referring to FIG. 16A, a viewing angle controllable display apparatus 40A is similar to the viewing angle controllable display apparatus 40 in FIG. 16, wherein identical elements are denoted by the same reference numerals, which will not be repeated therein. The main difference between the viewing angle controllable display apparatus 40A and the viewing angle controllable display apparatus 40 in FIG. 16 is described below. In the viewing angle controllable display apparatus 40A, the display panel 14 is located between the viewing angle control device 42 and the backlight module 16. With such configuration, the transmission axis T1231 of the at least one first polarizer 1231, the transmission axis T1233 of the third polarizer 1233 and the transmission axis T1235 of the at least one fifth polarizer 1235 are parallel to each other. Moreover, the included angle between the transmission axis T1232 of the second polarizer 1232 and the transmission axis T1231 of the at least one first polarizer 1231 on the reference plane R is $2\theta$.

The polarizers (the set of the plurality of polarizers is denoted by 123D) may further include at least one fourth polarizer 1234. The at least one fourth polarizer 1234 is located between the at least one compensation film 122 and the at least one half wave plate 124. Meanwhile, the included angle between the transmission axis T1234 of the at least one fourth polarizer 1234 and the transmission axis T1231 of the at least one first polarizer 1231 on the reference plane R is $2\theta$. In another embodiment, the at least one fourth polarizer 1234 may be omitted.

Figure 17A:
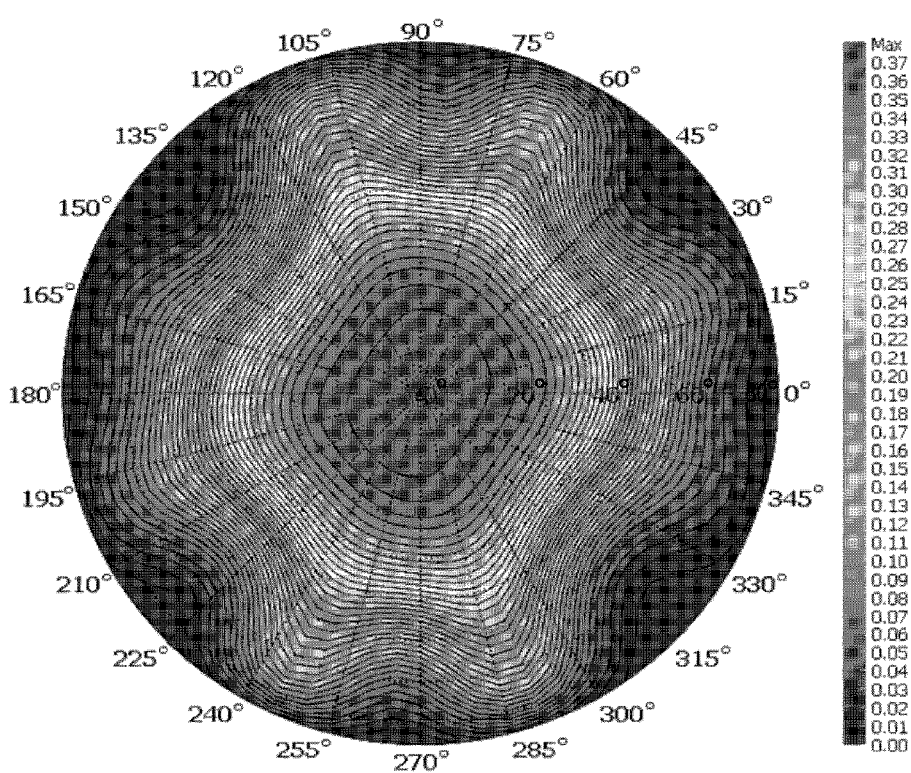
FIGS. 17A and 17B are schematic views respectively illustrating angle distributions that show the transmittance of different viewing angles of the viewing angle control device in the general display mode and the privacy protecting mode according to the fourth embodiment.
Figure 17B:
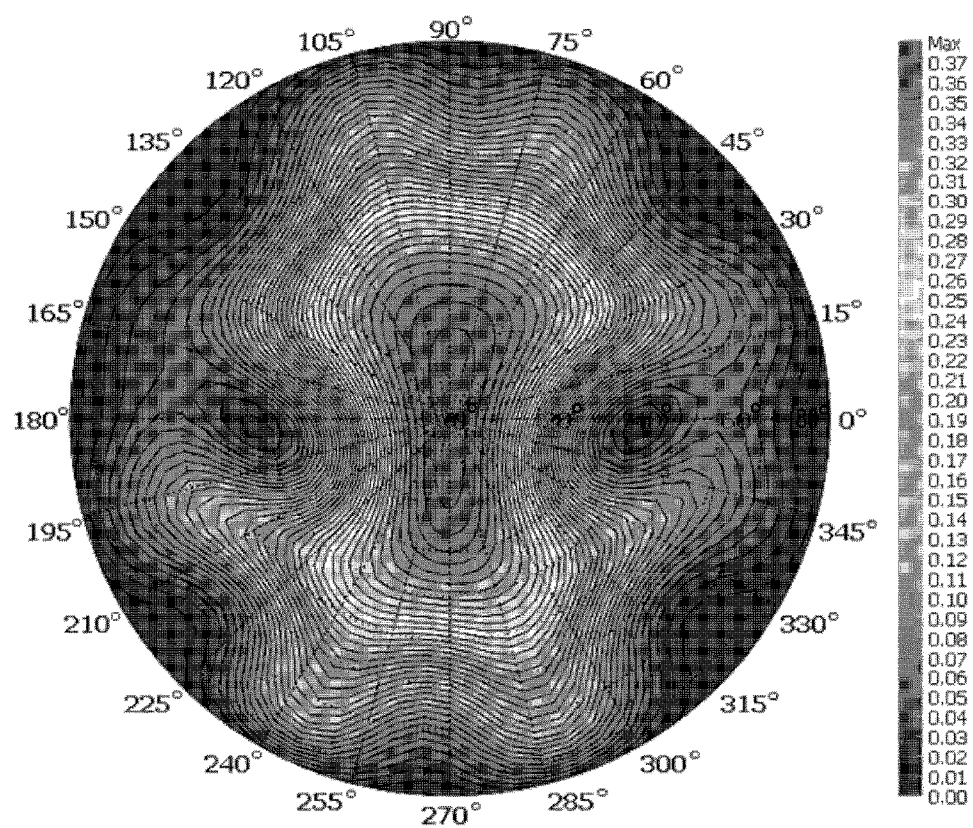

FIGS. 17A and 17B are schematic views respectively illustrating angle distributions that show the transmittance of different viewing angles of the viewing angle control device in the general display mode and the privacy mode according to the fourth embodiment. FIGS. 17A and 17B show that, by changing the potential difference between the transparent conductive layer 1211 and the transparent conductive layer 1212, the viewing angle control device 42 may meet the requirement of limiting viewing angle (privacy protecting) in the first direction D1 and a reverse direction thereof (see azimuth angles 0° and 180°). In addition, the viewing angle controllable display apparatus 40 using the viewing angle control device 42 can switch between the general display mode and the privacy protecting mode through the means of electrical control, thereby saving the trouble of having to manually placing/removing the light control film for the user in the conventional technique. In addition, a comparison between FIG. 17B and FIG. 3B shows that, as compared with the comparative example where only the liquid crystal panel and the polarizer are used to limit the viewing angle, the viewing angle control device 42 in the embodiment not only can improve the large angle light leakage LK in the azimuth angles 0° and 180° in FIG. 3B by utilizing the configuration of the at least one liquid crystal panel 121, the two compensation films 122, the set 123D of the plurality of polarizers and the at least one half wave plate 124, but also can reduce the large angle light leakage LKA in the azimuth angles 0°±45° and 180°±45° at the same time, thereby more effectively achieving the large angle privacy protecting effect.

In summary of the above, the embodiments of the invention at least have one of the advantages or effect described below. The viewing angle control device of the invention can control the inclining direction of the liquid crystal molecules by changing the potential difference between the transparent conductive layers, so that the light beam incident to the viewing angle control device in a large angle generates phase retardation and cannot pass through the polarizer, thereby meeting the requirement of limiting viewing angle (privacy protecting). In addition, with configuration of the at least one compensation film, the viewing angle control device can improve large angle light leakage and expand the privacy protecting range in an azimuth angle. Also, the viewing angle controllable display apparatus using the viewing angle control device can switch between the general display mode and the privacy protecting mode through the means of electrical control.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A viewing angle control device, comprising:
   at least one liquid crystal panel, wherein each of the at least one liquid crystal panel comprises two transparent conductive layers and a plurality of liquid crystal molecules located between the transparent conductive layers;
   at least one compensation film, overlapped with the at least one liquid crystal panel; and
   a plurality of polarizers, comprising:
      at least one first polarizer, located between the at least one compensation film and the at least one liquid crystal panel; and
      a second polarizer, located at a side of the at least one liquid crystal panel, the at least one compensation film and the at least one first polarizer, wherein when there is no potential difference between the transparent conductive layers, an optical axis of each of the liquid crystal molecules is parallel or perpendicular to a transmission axis of the at least one first polarizer, when there is potential difference between the transparent conductive layers, the optical axis of each of the liquid crystal molecules is inclined with respect to the transmission axis or an absorption axis of the at least one first polarizer.

2. The viewing angle control device according to claim 1, wherein each of the at least one compensation film is selected from one of the groups consisting of an O-plate and a C-plate.

3. The viewing angle control device according to claim 1, wherein a transmission axis of the second polarizer is parallel to the transmission axis of the at least one first polarizer.

4. The viewing angle control device according to claim 1, wherein the polarizers further comprise a third polarizer, the third polarizer is located at another side of the at least one liquid crystal panel, the at least one compensation film and the at least one first polarizer, and the at least one first polarizer is located between the second polarizer and the third polarizer.

5. The viewing angle control device according to claim 4, wherein transmission axes of the at least one first polarizer, the second polarizer and the third polarizer are parallel to each other.

6. The viewing angle control device according to claim 4, wherein an amount of the at least one first polarizer is two, and transmission axes of the two first polarizers, the second polarizer and the third polarizer are parallel to each other.

7. The viewing angle control device according to claim 4, further comprising at least one half wave plate, the at least one half wave plate located between the at least one compensation film and the at least one first polarizer, wherein an included angle between a slow axis of the at least one half wave plate and the transmission axis of the at least one first polarizer on a reference plane is θ, the reference plane is parallel to the at least one first polarizer, a transmission axis of one of the second polarizer and the third polarizer is parallel to the transmission axis of the at least one first polarizer, and an included angle between a transmission axis of the other one of the second polarizer and the third polarizer and the transmission axis of the at least one first polarizer on the reference plane is 2θ.

8. The viewing angle control device according to claim 7, wherein the polarizers further comprise at least one fourth polarizer, the at least one fourth polarizer is located between the at least one compensation film and the at least one half wave plate, and an included angle between a transmission axis of the at least one fourth polarizer and the transmission axis of the at least one first polarizer on the reference plane is 2θ.

9. The viewing angle control device according to claim 7, wherein an amount of the at least one compensation film is two, the polarizers further comprise at least one fifth polarizer, the at least one fifth polarizer is located between the compensation films and located between the at least one half wave plate and the at least one first polarizer, wherein transmission axes of the at least one fifth polarizer and the at least one first polarizer are parallel to each other.

10. The viewing angle control device according to claim 4, wherein an amount of the at least one compensation film is two, the polarizers further comprise at least one fifth polarizer, the at least one fifth polarizer is located between the compensation films, wherein transmission axes of the at least one first polarizer, the second polarizer, the third polarizer and the at least one fifth polarizer are parallel to each other.

11. A viewing angle controllable display apparatus, comprising:
a display panel; and
a viewing angle control device, overlapped with the display panel, and the viewing angle control device comprising at least one liquid crystal panel, at least one compensation film and a plurality of polarizers, wherein each of the at least one liquid crystal panel comprises two transparent conductive layers and a plurality of liquid crystal molecules located between the transparent conductive layers, the at least one compensation film is overlapped with the at least one liquid crystal panel, the polarizers comprise at least one first polarizer and a second polarizer, the at least one first polarizer is located between the at least one compensation film and the at least one liquid crystal panel, and the at least one liquid crystal panel, the at least one compensation film and the at least one first polarizer are located between the second polarizer and the display panel, when there is no potential difference between the transparent conductive layers, an optical axis of each of the liquid crystal molecules is parallel or perpendicular to a transmission axis of the at least one first polarizer, when there is potential difference between the transparent conductive layers, the optical axis of each of the liquid crystal molecules is inclined with respect to the transmission axis or an absorption axis of the at least one first polarizer.

12. The viewing angle controllable display apparatus according to claim 11, wherein the polarizers further comprise a third polarizer, the third polarizer is located between the second polarizer and the display panel, the at least one liquid crystal panel, the at least one compensation film and the at least one first polarizer are located between the second polarizer and the third polarizer, and the display panel is an organic light emitting diode display panel.

13. The viewing angle controllable display apparatus according to claim 11, wherein the display panel is a liquid crystal display panel, and the display panel comprises a light-incident surface polarizer and a light-emitting surface polarizer, the viewing angle controllable display apparatus further comprises a backlight module.

14. The viewing angle controllable display apparatus according to claim 13, wherein the viewing angle control device is located between the display panel and the backlight module.

15. The viewing angle controllable display apparatus according to claim 13, wherein the display panel is located between the viewing angle control device and the backlight module.

16. The viewing angle controllable display apparatus according to claim 13, wherein the polarizers further comprise a third polarizer, the third polarizer is located between the second polarizer and the display panel, and the at least one liquid crystal panel, the at least one compensation film and the at least one first polarizer are located between the second polarizer and the third polarizer.

17. The viewing angle controllable display apparatus according to claim 16, wherein transmission axes of the at least one first polarizer, the second polarizer and the third polarizer are parallel to each other.

18. The viewing angle controllable display apparatus according to claim 16, wherein an amount of the at least one first polarizer is two, and transmission axes of the two first polarizers, the second polarizer and the third polarizer are parallel to each other.

19. The viewing angle controllable display apparatus according to claim 16, wherein the viewing angle control device further comprises at least one half wave plate, the at least one half wave plate is located between the at least one compensation film and the at least one first polarizer, wherein an included angle between a slow axis of the at least one half wave plate and the transmission axis of the at least one first polarizer on a reference plane is θ, the reference plane is parallel to the at least one first polarizer, a transmission axis of one of the second polarizer and the third polarizer is parallel to the transmission axis of the at least one first polarizer, and an included angle between a transmission axis of the other one of the second polarizer and the third polarizer and the transmission axis of the at least one first polarizer on the reference plane is 2θ.

20. The viewing angle controllable display apparatus according to claim 19, wherein the polarizers further comprise at least one fourth polarizer, the at least one fourth polarizer is located between the at least one compensation film and the at least one half wave plate, and an included angle between transmission axes of the at least one fourth polarizer and the at least one first polarizer on the reference plane is 2θ.

21. The viewing angle controllable display apparatus according to claim 19, wherein the viewing angle control device is located between the display panel and the backlight module, the transmission axes of the at least one first polarizer and the second polarizer are parallel to each other, and an included angle between the transmission axis of the third polarizer and the transmission axis of the at least one first polarizer on the reference plane is 2θ.

22. The viewing angle controllable display apparatus according to claim 19, wherein the display panel is located between the viewing angle control device and the backlight module, the transmission axes of the at least one first polarizer and the third polarizer are parallel to each other, and an included angle between the transmission axis of the second polarizer and the transmission axis of the at least one first polarizer on the reference plane is 2θ.

23. The viewing angle controllable display apparatus according to claim 19, wherein an amount of the at least one compensation film is two, the polarizers further comprise at least one fifth polarizer, the at least one fifth polarizer is located between the compensation films and located between the at least one half wave plate and the at least one first polarizer, wherein transmission axes of the at least one fifth polarizer and the at least one first polarizer are parallel to each other.

24. The viewing angle controllable display apparatus according to claim 16, wherein an amount of the at least one compensation film is two, the polarizers further comprise at least one fifth polarizer, the at least one fifth polarizer is located between the compensation films, wherein transmission axes of the at least one first polarizer, the second polarizer, the third polarizer and the at least one fifth polarizer are parallel to each other.

25. The viewing angle controllable display apparatus according to claim 11, wherein each of the at least one compensation film is selected from one of the groups consisting of an O-plate and a C-plate.

\* \* \* \* \*

UNITED STATES PATENT AND TRADEMARK OFFICE
CERTIFICATE OF CORRECTION

| | |
|---|---|
| PATENT NO. | : 10,216,018 B2 |
| APPLICATION NO. | : 15/730740 |
| DATED | : February 26, 2019 |
| INVENTOR(S) | : Chung-Yang Fang et al. |

Page 1 of 1

It is certified that error appears in the above-identified patent and that said Letters Patent is hereby corrected as shown below:

On the Title Page

Item (72) Inventor is corrected to read:
--Chung-Yang Fang, Hsin-Chu, (TW);
Wen-Chun Wang, Hsin-Chu, (TW)--.

Signed and Sealed this
Thirtieth Day of June, 2020

Andrei Iancu
*Director of the United States Patent and Trademark Office*